United States Patent
Chen et al.

(10) Patent No.: US 12,516,446 B2
(45) Date of Patent: Jan. 6, 2026

(54) ARRAY AND METHOD FOR DETECTING SPATIAL INFORMATION OF NUCLEIC ACIDS

(71) Applicants: BGI SHENZHEN, Shenzhen (CN); MGI TECH CO., LTD., Shenzhen (CN)

(72) Inventors: Ao Chen, Shenzhen (CN); Xun Xu, Shenzhen (CN); Sha Liao, Shenzhen (CN); Jin Yang, Shenzhen (CN); Longqi Liu, Shenzhen (CN); Ou Wang, Shenzhen (CN); Yuxiang Li, Shenzhen (CN); Guoxin Tang, Shenzhen (CN); Yuan Jiang, Shenzhen (CN); Chongjun Xu, Shenzhen (CN); Ming Ni, Shenzhen (CN); Wenwei Zhang, Shenzhen (CN); Radoje Drmanac, Shenzhen (CN); Snezana Drmanac, Shenzhen (CN)

(73) Assignees: BGI SHENZHEN, Guangdong (CN); MGI TECH CO., LTD., Guangdong (CN)

(*) Notice: Subject to any disclaimer, the term of this patent is extended or adjusted under 35 U.S.C. 154(b) by 1076 days.

(21) Appl. No.: 17/611,099

(22) PCT Filed: May 14, 2020

(86) PCT No.: PCT/CN2020/090340
§ 371 (c)(1),
(2) Date: Nov. 12, 2021

(87) PCT Pub. No.: WO2020/228788
PCT Pub. Date: Nov. 19, 2020

(65) Prior Publication Data
US 2023/0175047 A1  Jun. 8, 2023

(30) Foreign Application Priority Data

May 15, 2019 (CN) .................. 201910403775.6
Dec. 6, 2019 (CN) .................. 201911240733.1

(51) Int. Cl.
*C40B 50/06* (2006.01)
*C12N 15/10* (2006.01)

(52) U.S. Cl.
CPC .......... *C40B 50/06* (2013.01); *C12N 15/1093* (2013.01)

(58) Field of Classification Search
None
See application file for complete search history.

(56) References Cited

U.S. PATENT DOCUMENTS

2009/0270273 A1   10/2009  Burns et al.
2010/0273679 A1*  10/2010  Cuppoletti ........... C12Q 1/6834
                                                   506/26
2015/0148239 A1    5/2015  Peter et al.

FOREIGN PATENT DOCUMENTS

CN     102834526 A    12/2012
CN     103781918 A     5/2014
(Continued)

OTHER PUBLICATIONS

Salmen et al., "Barcoded solid-phase RNA capture for Spatial Transcriptomics profiling in mammalian tissue sections", Nature Protocols, 2018, 13: 2501-2534.
(Continued)

*Primary Examiner* — Christian C Boesen
(74) *Attorney, Agent, or Firm* — James S. Keddie; Bozicevic, Field & Francis LLP

(57) ABSTRACT

Provided are a method for detecting spatial information of nucleic acids in a sample, as well as a nucleic acid array used
(Continued)

AA    DNB primer
CC    Complement of positioning sequence
EE    Complement of second immobilization sequence
GG    Capture sequence polyT
HH    Reverse complement of TSO in the method and a method for producing the nucleic acid array.

19 Claims, 10 Drawing Sheets

Specification includes a Sequence Listing.

(56) References Cited

FOREIGN PATENT DOCUMENTS

| CN | 105505755 | A | 4/2016 |
|---|---|---|---|
| CN | 105986324 | A | 10/2016 |
| CN | 107532207 | A | 1/2018 |
| CN | 108138225 | A | 6/2018 |
| JP | 2011520420 | A | 7/2011 |
| WO | WO 2009/034181 | A2 | 3/2009 |
| WO | WO 2009/076238 | A2 | 6/2009 |
| WO | WO2009132028 | A1 | 10/2009 |
| WO | WO 2012/140224 | A1 | 10/2012 |
| WO | WO 2016/162309 | A1 | 10/2016 |
| WO | WO 2016/168825 | A1 | 10/2016 |
| WO | WO 2017/019456 | A2 | 2/2017 |
| WO | WO2017044893 | A1 | 3/2017 |
| WO | WO2018075436 | A1 | 4/2018 |

OTHER PUBLICATIONS

Liu et al., "Spatial resolving method on DNA nanoballs with polarization parametric indirect microscopy", Journal of Nanophotonics, Feb. 7, 2019, 13(1), pp. 1-11.

Rodriques et al., "Slide-seq: A Scalable Technology for Measuring Genome-Wide Expression at High Spatial Resolution", Science, Mar. 29, 2019, 363(6434): 1463-1467.

Stahl et al., "Visualization and analysis of gene expression in tissue sections by spatial transcriptomics", Science, 2016, 353(6294): 78-82.

Kim et al., "Biomimetic DNA nanoballs for oligonucleotide delivery", Biomaterials, 2015, 62: 155-163.

Office Action Summary (Examination Result) issued for United Arab Emirates Application No. P6002076/2021, Mar. 20, 2025.

Drmanac et al., "Human Genome Sequencing Using Unchained Base Reads on Self-Assembling DNA Nanoarrays", Science, Jan. 2010, 327: 78-81.

Second Written Opinion issued for Singapore Application No. 11202112703Q, Jul. 9, 2025.

* cited by examiner

| | |
|---|---|
| AA | DNB primer |
| BB | First immobilization sequence |
| CC | Complement of positioning sequence |
| DD | Positioning sequence |
| EE | Complement of second immobilization sequence |
| FF | Second immobilization sequence |
| GG | Capture sequence polyT |
| HH | Reverse complement of TSO |

AA   DNB primer
CC   Complement of positioning sequence
EE   Complement of second immobilization sequence
GG   Capture sequence polyT
HH   Reverse complement of TSO

ARRAY AND METHOD FOR DETECTING SPATIAL INFORMATION OF NUCLEIC ACIDS

CROSS-REFERENCE TO RELATED APPLICATIONS

This application is a § 371 national phase of International Application No. PCT/CN2020/090340, filed on May 14, 2020, which claims the benefit of Chinese Application No. 201910403775.6, filed on May 15, 2019, and Chinese Application No. 201911240733.1, filed on Dec. 6, 2019, all of which applications are incorporated by reference herein.

TECHNICAL FIELD

The invention relates to the field of biomolecule spatial detection. Specifically, the present invention provides a method for detecting spatial information of nucleic acid in a sample, a nucleic acid array used in the method, and a method for producing the nucleic acid array.

BACKGROUND ART

The spatial locations of cells in a tissue significantly affects their functions. In order to explore this spatial heterogeneity, it is necessary to quantify and analyze the cell's genome or transcriptome with the knowledge of the spatial coordinates. However, collecting small tissue regions or even single cells for genome or transcriptome analysis is very laborious, costly, and with low precision. Therefore, it is very necessary to develop a method that can achieve single-cellular or even subcellular level and high-throughput detection of spatial information (for example, nucleic acid location, distribution, and/or expression) of a biomolecule (for example, a nucleic acid).

CONTENTS OF THE INVENTION

In order to realize the spatial detection of nucleic acid, the prior art combines array technology with high-throughput DNA sequencing technology to capture and label nucleic acid with positional tag in a tissue sample, and sequence and analyze it. In order to obtain a chip that can achieve the above-mentioned purpose, the prior art fixes a probe capable of capturing nucleic acid on the chip by spotting or a bead-based method. However, the active region size of the chip obtained by using the micro-volume spotting system for the method of droplet spotting on a plane is as high as 200 microns, and the cell observation precision is only 20 cells; the active region size of the chip obtained by using the bead-based method with spread-plating of beads labelled with positional tags is up to 10 microns, and the cell observation precision can only reach a single cell level, and the subcellular level cannot be achieved. The present invention provides a novel nucleic acid array for nucleic acid spatial detection, a preparation method thereof, and a nucleic acid spatial detection method based on the array, which can simultaneously realize high-precision subcellular localization and high-throughput tissue localization, and has important applications value.

Preparation of Nucleic Acid Array

In the first aspect, the present invention provides a method for generating a nucleic acid array for detecting spatial information of a nucleic acid in a biological sample, the method comprising the following steps:

(1) providing multiple kinds of carrier sequences, each kind of carrier sequence comprises a plurality of copies of the carrier sequence, and the carrier sequence in the direction from 5' to 3' comprises a positioning sequence and a first immobilization sequence, the positioning sequence has a unique nucleotide sequence corresponding to the position of the kind of carrier sequence on the array;

the first immobilization sequence allows annealing to its complementary nucleotide sequence and initiating an extension reaction;

(2) ligating the multiple kinds of carrier sequences to a surface of a solid support (e.g., a chip);

(3) providing a first primer, and using the carrier sequence as a template to perform a primer extension reaction, so that the region of the first immobilization sequence and the positioning sequence of the carrier sequence forms a double strand, wherein the strand that hybridizes with the carrier sequence is a first nucleic acid molecule, the first nucleic acid molecule in the direction from 5' to 3' comprises a complementary sequence of the first immobilization sequence and the positioning sequence; wherein, the first primer at its 3' end comprises a first immobilization sequence complementary region, the first immobilization sequence complementary region comprises a complementary sequence of the first immobilization sequence or a fragment thereof, and has a free 3' end.

In certain embodiments, the carrier sequence and the first nucleic acid molecule are single-stranded nucleic acid sequences. In some embodiments, the carrier sequence and the first nucleic acid molecule are single-stranded DNA sequences.

In some embodiments, in step (3), while performing the extension reaction, the carrier sequence is sequenced, so as to obtain the sequence information of the positioning sequence contained in the carrier sequence.

In some embodiments, in step (1), the multiple kinds of carrier sequences are provided through the following steps:

(i) providing multiple kinds of carrier sequence templates, the carrier sequence template comprises the complementary sequence of the carrier sequence;

(ii) using each kind of carrier sequence template as a template to perform a nucleic acid amplification reaction so as to obtain an amplification product of each kind of carrier sequence template, in which the amplification product comprises a plurality of copies of the carrier sequence.

In certain embodiments, the amplification is selected from rolling circle amplification (RCA), bridge PCR amplification, multiple strand displacement amplification (MDA), or emulsion PCR amplification.

In certain embodiments, the rolling circle amplification is performed to obtain a DNB formed by a concatemer of the carrier sequence. In such embodiments, a circular template sequence is provided in step (i). The method for preparing circular nucleic acid molecules is a conventional method in the art, and can be selected according to needs by those skilled in the art. For example, a linear nucleic acid template can be obtained first, and then circularization of the linear nucleic acid template can be realized by a ligase (e.g., DNA ligase).

In some embodiments, the bridge PCR amplification, emulsion PCR amplification, or multiple strand displacement amplification is performed to obtain a DNA cluster formed by a clone population of the carrier sequence.

In some embodiments, the method further comprises the following steps:
  (4) providing a second nucleic acid molecule, the second nucleic acid molecule comprises a capture sequence; the capture sequence is capable of hybridizing with the whole or part of a nucleic acid to be captured, and comprises: (a) an oligonucleotide sequence capable of capturing mRNA; and/or, (b) a random or degenerate oligonucleotide sequence; or, (c) a specific sequence for a specific target nucleic acid; and, the capture sequence has a free 3' end to enable the second nucleic acid molecule to function as an extension primer,
  (5) ligating the second nucleic acid molecule to the first nucleic acid molecule (for example, ligating the second nucleic acid molecule to the first nucleic acid molecule by using a ligase).

In certain embodiments, the second nucleic acid molecule is a single-stranded nucleic acid sequence. In certain embodiments, the second nucleic acid molecule is a single-stranded DNA sequence. In certain embodiments, the second nucleic acid molecule is a single-stranded RNA sequence.

In certain embodiments, the second nucleic acid molecule in the direction from 5' to 3' comprises an immobilization region and a capture sequence, and the immobilization region comprises a double-stranded nucleic acid sequence, such as a double-stranded DNA sequence. In some embodiments, the capture sequence contained in the second nucleic acid molecule is a single-stranded nucleic acid sequence, such as a single-stranded DNA sequence or a single-stranded RNA sequence. It is easy to understand that in such embodiments, the second nucleic acid molecule has a partially double-stranded structure, that is, its immobilization region has a double-stranded structure, and its capture sequence has a single-stranded structure.

In certain embodiments, the double-stranded nucleic acid sequence has a length of 1 bp to 50 bp, for example, 10 bp to 50 bp, 10 bp to 40 bp, or 10 bp to 30 bp.

In other embodiments, the method further comprises the following steps:
  (4) providing a second nucleic acid molecule, in which the second nucleic acid molecule in the direction from 5' to 3' comprises a complement of second immobilization sequence and a capture sequence;
  the complement of second immobilization sequence allows hybridizing to its complementary nucleotide sequence;
  the capture sequence is capable of hybridizing with the whole or part of a nucleic acid to be captured, and comprises: (a) an oligonucleotide sequence capable of capturing mRNA; and/or, (b) a random or degenerate oligonucleotide sequence; or, (c) a specific sequence for a specific target nucleic acid; and, the capture sequence has a free 3' end to enable the second nucleic acid molecule to function as an extension primer;
  (5) hybridizing the complement of second immobilization sequence with the second immobilization sequence under a condition that allows annealing, thereby ligating the second nucleic acid molecule to the carrier sequence;
  (6) optionally, ligating the first nucleic acid molecule to the second nucleic acid molecule that are hybridized to the carrier sequence respectively (for example, ligating the second nucleic acid molecule to the first nucleic acid molecule by using a ligase).

In such embodiments, each carrier sequence further comprises a second immobilization sequence at its 5' end, the second immobilization sequence allows annealing to its complementary nucleotide sequence. In some embodiments, the second immobilization sequence allows annealing to its complementary nucleotide sequence and initiating an extension reaction (for example, it can be used as a binding site of a bridge PCR primer).

In certain embodiments, the second nucleic acid molecule is a single-stranded nucleic acid sequence. In certain embodiments, the second nucleic acid molecule is a single-stranded DNA sequence. In certain embodiments, the second nucleic acid molecule is a single-stranded RNA sequence.

In certain embodiments, the second immobilization sequence is adjacent to the positioning sequence.

In some embodiments, the second immobilization sequence has a length of 1 bp to 50 bp, for example, 10 bp to 50 bp, 10 bp to 40 bp, 10 bp to 30 bp, or 10 bp to 20 bp.

In some embodiments, in step (3), the first primer further comprises a unique molecular identifier (UMI) sequence at the 5' end of the first immobilization sequence complementary region contained therein, so that the first nucleic acid molecule comprises a UMI sequence at the 5' end of the complement of first immobilization sequence contained therein; or, in step (4), the second nucleic acid molecule further comprises a UMI sequence, and the UMI sequence is located at the 5' end of the capture sequence;
  the UMI sequence is a nucleotide sequence composed of at least 1 (for example, at least 2, at least 3, at least 4, or at least 5; for example, 5 to 100, 5 to 50, 5 to 20, such as 10) nucleotide N, and each N is independently any one of A, C, G and T.

In some embodiments, when the first primer comprises the unique molecular identifier (UMI) sequence at the 5' end of the first immobilization sequence complementary region contained therein, the first primer may further comprise an additional sequence at the 5' end of the UMI sequence.

In some embodiments, the oligonucleotide sequence capable of capturing mRNA comprises a sequence capable of hybridizing with a poly-A tail of the mRNA. In certain embodiments, the oligonucleotide sequence capable of capturing mRNA comprises a poly-T oligonucleotide sequence. In certain embodiments, the poly-T oligonucleotide sequence comprises at least 10 (e.g., at least 20) deoxythymidine residues.

In certain embodiments, the solid support is a chip. In some embodiments, the solid support can be used as a sequencing platform, such as a sequencing chip. In some embodiments, the solid support is a high-throughput sequencing chip, such as a high-throughput sequencing chip used in Illumina, MGI, or Thermo Fisher sequencing platform.

In a second aspect, the present invention provides a method for generating a nucleic acid array for detecting spatial information of a nucleic acid in a biological sample, the method comprising the following steps:
  (1) providing multiple kinds of carrier sequences, each kind of carrier sequence comprises a plurality of copies of the carrier sequence, the carrier sequence in the direction from 5' to 3' comprises: a capture sequence template, a positioning sequence and a first immobilization sequence,
  the capture sequence template comprises a complementary sequence of a capture sequence, and the capture sequence is capable of hybridizing with the whole or part of a nucleic acid to be captured, which comprises: (a) an oligonucleotide sequence capable of capturing mRNA; and/or, (b) a random or degenerate oligonucleotide sequence; or, (c) a specific sequence for a specific target nucleic acid;

the positioning sequence has a unique nucleotide sequence corresponding to the position of the kind of carrier sequence on the array;

the first immobilization sequence allows annealing to its complementary nucleotide sequence and initiating an extension reaction; and, the first immobilization sequence also comprises a cleavage site, and the cleavage may be selected from enzymatic cleavage with nicking enzyme, enzymatic cleavage with USER enzyme, photocleavage, chemical cleavage or CRISPR-based cleavage;

(2) ligating the multiple kinds of carrier sequences to a surface of a solid support (e.g., a chip);

(3) providing a first primer (or referred to as a probe primer), the first primer in the direction from 5' to 3' comprises a binding region, a cleavage region and a first immobilization sequence complementary region, and the first immobilization sequence complementary region comprises a complementary sequence of the first immobilization sequence or a fragment thereof, and has a free 3' end; the binding region comprises a linker that can be ligated to the surface of the solid support; the cleavage region comprises a cleavage site;

using the first primer as a primer and the carrier sequence as a template to perform a primer extension reaction, so that the region of the first immobilization sequence, the positioning sequence and the capture sequence template of the carrier sequence forms a double-stranded strand, wherein a strand hybridized with the carrier sequence is a first nucleic acid molecule, and the first nucleic acid molecule in the direction from 5' to 3' comprises a complement of first immobilization sequence, a complement of positioning sequence, and a capture sequence; the first nucleic acid molecule can also be referred to as a capture probe;

(4) ligating the first primer to the surface of the solid support; wherein, steps (3) and (4) are performed in any order;

(5) optionally performing cleavage at the cleavage site contained in the first immobilization sequence of the carrier sequence to digest the carrier sequence, so that the extension product of step (3) is separated from the template (i.e., the carrier sequence) for forming the extension product, so that the first nucleic acid molecule (the capture probe) is ligated to the surface of the solid support (e.g., chip).

Since the capture probe (i.e., the first nucleic acid molecule) is obtained by using the carrier sequence as template and performing primer extension, the capture probe comprises a complement of the unique positioning sequence corresponding to the position of the kind of capture probe (the kind of carrier sequence) on the array, and a capture sequence that can hybridize with the whole or part of a nucleic acid molecule to be captured. The position of the kind of capture probe on the array can be determined by analyzing the complement of the positioning sequence.

In this context, the expression "each kind of carrier sequence" refers to carrier sequences comprising the same positioning sequence.

In some embodiments, in step (1), the multiple kinds of carrier sequences are provided through the following steps:
(i) providing multiple kinds of carrier sequence templates, the carrier sequence template comprises a complementary sequence of the carrier sequence;
(ii) using each kind of carrier sequence template as a template to perform a nucleic acid amplification reaction so as to obtain an amplification product of each kind of carrier sequence template, in which the amplification product comprises a plurality of copies of the carrier sequence.

In certain embodiments, the amplification is selected from rolling circle amplification (RCA), bridge PCR amplification, multiple strand displacement amplification (MDA), or emulsion PCR amplification.

In certain embodiments, the rolling circle amplification is performed to obtain a DNB formed by a concatemer of the carrier sequence. In such embodiments, a circular template sequence is provided in step (i). The method for preparing circular nucleic acid molecules is a conventional method in the art, and can be selected according to needs by those skilled in the art. For example, a linear nucleic acid template can be obtained first, and then circularization of the linear nucleic acid template can be realized by a ligase (e.g., a DNA ligase).

In certain embodiments, each kind of carrier sequence is a DNB formed by a concatemer of a plurality of copies of the carrier sequence.

In some embodiments, step (1) comprises the following steps:
(1a) providing a circular nucleic acid template, the circular nucleic acid template comprises one kind of carrier sequence template, the carrier sequence template comprises a complementary sequence of the carrier sequence, that is, the carrier sequence template in the direction from 5' to 3' comprises a complement of first immobilization sequence, a complement of positioning sequence and a capture sequence;
(1b) performing rolling circle amplification (RCA) by using the circular nucleic acid template as a template to obtain a DNA nanoball (DNB) formed by a concatemer of the carrier sequence.

In some embodiments, bridge PCR amplification, emulsion PCR amplification, or multiple strand displacement amplification is performed to obtain a DNA cluster formed by a clone population of the carrier sequence.

In some embodiments, the cleavage site contained in the first immobilization sequence is a cleavage site of nicking enzyme. In some embodiments, the nicking enzyme is selected from USER, BamHI, BmtI, etc. In certain exemplary embodiments, the cleavage site is shown in SEQ ID NO: 14.

In some embodiments, the first immobilization sequence further comprises a hybridization region for sequencing primer and/or a hybridization region for amplification primer; wherein the hybridization region for sequencing primer allows annealing to a sequencing primer and initiating a sequencing reaction, and the hybridization region for amplification primer allows annealing to an amplification primer and initiating an extension and amplification reaction.

In some embodiments, the first immobilization sequence has a length of greater than 1 bp, such as greater than 10 bp, or greater than 20 bp. In some embodiments, the first immobilization sequence has a length of 20 to 100 bp, such as 20 to 80 bp.

In some embodiments, the positioning sequence has a length of greater than 1 bp, such as greater than 10 bp. In some embodiments, the positioning sequence has a length of 10 to 100 bp, such as 10 to 50 bp, such as 10 to 30 bp, such as 20 bp.

In some embodiments, the oligonucleotide sequence capable of capturing mRNA comprises a sequence capable of hybridizing with a poly-A tail of the mRNA. In certain embodiments, the oligonucleotide sequence capable of capturing mRNA comprises a poly-T oligonucleotide sequence. In certain embodiments, the poly-T oligonucleotide sequence comprises at least 10 (e.g., at least 20) deoxythymidine residues.

In some embodiments, the capture sequence has a length of greater than 1 bp. In some embodiments, the capture sequence has a length of 1 to 100 bp, such as 10 to 50 bp, such as 10 to 30 bp.

In some embodiments, the carrier sequence further comprises a complement of UMI sequence (also referred to as a probe tag region) located downstream of the capture sequence template and upstream of the first immobilization sequence, the complement of UMI sequence is complementary to a UMI sequence, and the UMI sequence is a nucleotide sequence composed of at least 1 (for example, at least 2, at least 3, at least 4, or at least 5; for example, 5 to 100, 5 to 50, 5 to 20, such as 10) nucleotide N, wherein each N is independently any one of A, C, G and T. In some embodiments, the complement of UMI sequence is located between the positioning sequence and the capture sequence template. In other embodiments, the complement of UMI sequence is located between the first immobilization sequence and the positioning sequence. In such embodiments, in step (3), when the primer extension reaction is performed using the carrier sequence as a template, the first nucleic acid molecule/capture probe that hybridizes to the carrier sequence will correspondingly comprise the UMI sequence (also referred to as probe tag).

In some embodiments, in order to obtain the aforementioned UMI sequence or its complementary sequence, a template sequence of the carrier sequence (i.e., a carrier sequence template) comprises a UMI sequence template at a corresponding position, and the UMI sequence template is a sequence composed of modified bases, the modified bases are capable of complementary pairing by hydrogen bonds with a variety of main bases (for example, C, G, A, T, U); for example, the modified base can be Inosine, which is capable of complementary pairing with bases A, C and U. Without being bound by any theory, it is believed that when the carrier sequence template comprises the UMI sequence template, every time the amplification is performed in the rolling circle amplification process, the bases capable of complementary pairing with the UMI sequence template are randomly bonded, so that the amplification product of each time has a unique UMI sequence which is randomly formed, thereby distinguishing the amplification product of each time. Thus, for example, copy number can be quantified for different nucleic acid molecules which are captured. In some embodiments, the UMI sequence template comprises a plurality of (e.g., at least 10, such as 10 to 100) Inosines. In some embodiments, the UMI sequence template has a length of greater than 1 bp. In some embodiments, the UMI sequence template has a length of greater than 5 bp. In some embodiments, the UMI sequence template has a length of 5 to 100 bp, such as 5 to 50 bp, such as 5 to 20 bp, such as 5 to 15 bp, such as 10 bp.

In certain embodiments, the solid support is a chip. In some embodiments, the solid support can be used as a sequencing platform. In some embodiments, the solid support is a sequencing chip (MGI), such as a sequencing chip of BGISEQ-500 platform. In some embodiments, the solid support is a high-density array chip, which can be obtained, for example, by the method described in patent CN103180496B.

The carrier sequence (e.g., DNB) can be ligated to the surface of the solid support by any suitable method known in the art. In certain embodiments, non-limiting examples of the method include nucleic acid hybridization, biotin-streptavidin binding, sulfhydryl binding, photo-activated binding, covalent binding, antibody-antigen, physical limitation by hydrogel or other porous polymer materials, etc., or any combination thereof.

In some embodiments, the solid support is selected from the following materials: glass, silicon, polylysine coating material, nitrocellulose, polystyrene, cyclic olefin copolymers (COCs), cyclic olefins polymers (COPs), polypropylene, polyethylene or polycarbonate, etc.

In some embodiments, in step (3), while performing the primer extension reaction, the carrier sequence (for example, the positioning sequence contained therein) is sequenced, so as to obtain the sequence information of the positioning sequence contained in the carrier sequence.

In some embodiments, before step (3), a step of sequencing the carrier sequence (for example, the positioning sequence contained therein) is further comprised. In some embodiments, after the sequencing is completed, washing is performed to remove dNTP which has been added to the synthetic strand due to the sequencing.

In certain embodiments, the linker is a linking group capable of coupling with an activating group (e.g., $NH_2$). In such embodiments, the surface of the solid support is modified with an activating group (e.g., $NH_2$). In some embodiments, the linker comprises —SH, -DBCO, —NHS, and the like. In certain exemplary embodiments, the linker is DBCO, and Azido-dPEG®8-NHS ester is attached to the surface of the solid support.

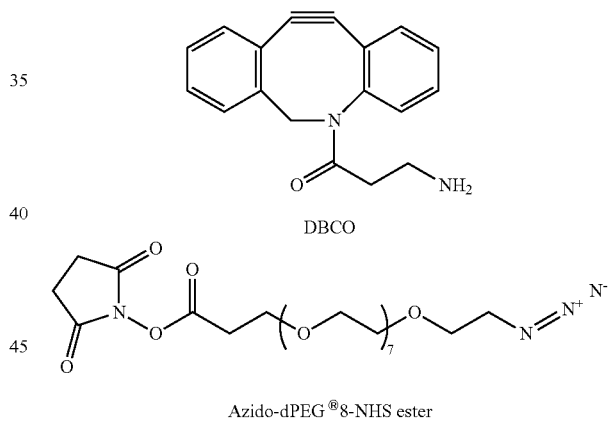

DBCO

Azido-dPEG®8-NHS ester

In some embodiments, the cleavage site contained in the cleavage region of the first primer is a site where a controlled cleavage can be performed by a chemical, enzymatic, or photochemical method. In certain embodiments, the cleavage site is a cleavage site of enzyme. In some embodiments, the enzyme site is an enzyme site of USER enzyme (UUU).

In some embodiments, the cleavage region of the first primer is different from the cleavage site contained in the first immobilization sequence of the carrier sequence.

In certain embodiments, the amplification comprises PCR.

Nucleic Acid Array and Kit

In a third aspect, the present invention provides a nucleic acid array for detecting spatial information of a nucleic acid in a sample, which comprises a solid support (e.g., a chip) with multiple kinds of carrier sequences attached to its surface, in which each kind of carrier sequence occupies a different position in the array, each kind of carrier sequence comprises a plurality of copies of the carrier sequence, and the carrier sequence in the direction from 5' to 3' comprises a positioning sequence and a first immobilization sequence, the positioning sequence has a unique nucleotide sequence corresponding to the position of the kind of carrier sequence on the array;

the first immobilization sequence allows annealing to its complementary nucleotide sequence and initiating an extension reaction.

In certain embodiments, said each kind of carrier sequence (i.e., the carrier sequences comprising the same positioning sequence) occupies an area (i.e., active region) having a diameter of less than 1 micron, for example, about 900 nanometers, about 800 nanometers, about 700 nanometers, about 600 nanometers, or about 500 nanometers, on the surface of the solid support.

In some embodiments, the nucleic acid array further comprises a first nucleic acid molecule, in which the first nucleic acid molecule in the direction from 5' to 3' comprises: a complement of first immobilization sequence and a complement of positioning sequence, and forms a double strand structure by hybridizing with the first immobilization sequence and the positioning sequence of the carrier sequence. It is easy to understand that in the first nucleic acid molecule, only the complement of first immobilization sequence and the complement of positioning sequence are complementary to the corresponding sequences of the carrier sequence and therefore form a double strand, so that the double strand formed by the first immobilization sequence and the carrier sequence is an incomplete double strand, that is, a partial double-stranded structure.

In certain embodiments, each copy of each kind of carrier sequence comprises a first nucleic acid molecule hybridized therewith.

In certain embodiments, the carrier sequence and the first nucleic acid molecule are single-stranded nucleic acid sequences. In some embodiments, the carrier sequence and the first nucleic acid molecule are single-stranded DNA sequences.

In some embodiments, the nucleic acid array further comprises a second nucleic acid molecule, in which the second nucleic acid molecule is ligated to the first nucleic acid molecule thereby being immobilized to the nucleic acid array, and the second nucleic acid molecule comprises a capture sequence;

the capture sequence can hybridize with the whole or part of a nucleic acid to be captured, and comprises: (a) an oligonucleotide sequence capable of capturing mRNA; and/or, (b) a random or degenerate oligonucleotide sequence; or, (c) a specific sequence for a specific target nucleic acid; and, the capture sequence has a free 3' end to enable the second nucleic acid molecule to function as an extension primer.

In certain embodiments, each first nucleic acid molecule is ligated to the second nucleic acid molecule.

In some embodiments, the 5' end of the second nucleic acid molecule is ligated to the 3' end of the first nucleic acid molecule.

In other embodiments, the nucleic acid array further comprises a second nucleic acid molecule, in which the second nucleic acid hybridizes with the carrier sequence thereby being immobilized to the nucleic acid array.

In such embodiments, each carrier sequence further comprises a second immobilization sequence at its 5' end, the second immobilization sequence allows annealing to its complementary nucleotide sequence; and, the second nucleic acid molecule in the direction from 5' to 3' comprises a complement of second immobilization sequence and a capture sequence; the complement of second immobilization sequence hybridizes with the second immobilization sequence of the carrier sequence to form a double strand;

the capture sequence can hybridize with the whole or part of a nucleic acid to be captured, and comprises: (a) an oligonucleotide sequence capable of capturing mRNA; and/or, (b) a random or degenerate oligonucleotide sequence; or, (c) a specific sequence for a specific target nucleic acid; and, the capture sequence has a free 3' end to enable the second nucleic acid molecule to function as an extension primer.

In certain embodiments, each copy of each kind of carrier sequence comprises a second nucleic acid molecule hybridized therewith.

In some embodiments, the second immobilization sequence allows annealing to its complementary nucleotide sequence and initiating an extension reaction (for example, it can be used as a binding site of a bridge PCR primer).

In certain embodiments, the second immobilization sequence is adjacent to the positioning sequence.

In certain embodiments, the second nucleic acid molecule has a modification of 5' end. In certain embodiments, the modification is phosphorylation or biotin modification.

In certain embodiments, the second nucleic acid molecule is a single-stranded nucleic acid sequence. In certain embodiments, the second nucleic acid molecule is a single-stranded DNA sequence. In certain embodiments, the second nucleic acid molecule is a single-stranded RNA sequence.

In some embodiments, the multiple copies of the carrier sequence are an amplification product formed by amplification of the complementary sequence of the carrier sequence as a template, and the amplification is selected from rolling circle amplification (RCA), bridge PCR amplification, multiple strand displacement amplification (MDA) or emulsion PCR amplification.

In certain embodiments, the multiple copies of the carrier sequence are a DNB formed by a concatemer of the carrier sequence. In certain embodiments, the multiple copies of the carrier sequence are a DNB formed by rolling circle amplification using the complementary sequence of the carrier sequence as a template.

In certain embodiments, the multiple copies of the carrier sequence are a DNA cluster formed by a clone population of the carrier sequence.

In some embodiments, the multiple copies of the carrier sequence are a DNA cluster formed by bridge PCR amplification using the complementary sequence of the carrier sequence as a template.

In some embodiments, the multiple copies of the carrier sequence are a DNA cluster formed by emulsion PCR amplification of the complementary sequence of the carrier sequence as a template.

In some embodiments, the multiple copies of the carrier sequence are a DNA cluster formed by multiple strand displacement amplification by using the complementary sequence of the carrier sequence as a template.

In some embodiments, the first nucleic acid molecule further comprises a unique molecular identifier (UMI) sequence, and the UMI sequence is located at the 5' end of the complement of first immobilization sequence; or, the second nucleic acid molecule further comprises a UMI sequence, and the UMI sequence is located at the 5' end of the capture sequence;

the UMI sequence is a nucleotide sequence composed of at least 1 (for example, at least 2, at least 3, at least 4, or at least 5; for example, 5 to 100, 5 to 50, 5 to 20, such as 10) nucleotide N, and each N is independently any one of A, C, G and T.

In certain embodiments, the solid support is a chip. In some embodiments, the solid support can be used as a sequencing platform, such as a sequencing chip. In some embodiments, the solid support is a high-throughput sequencing chip, such as a high-throughput sequencing chip used in Illumina, MGI, or Thermo Fisher sequencing platform.

In some embodiments, the oligonucleotide sequence capable of capturing mRNA comprises a sequence capable of hybridizing to a poly-A tail of the mRNA. In certain embodiments, the oligonucleotide sequence capable of capturing mRNA comprises a poly-T oligonucleotide sequence. In certain embodiments, the poly-T oligonucleotide sequence comprises at least 10 (e.g., at least 20) deoxythymidine residues.

In some embodiments, the positioning sequence has a length of greater than 1 nt, such as greater than 5 nt. In some embodiments, the positioning sequence has a length of 5 to 50 nt, such as 10 to 50 nt, 10 to 30 nt, or 20 to 30 nt. In some embodiments, the lengths of the positioning sequences contained in different kinds of carrier sequences may be the same or different.

In some embodiments, the capture sequence has a length of greater than 1 nt. In certain embodiments, the capture sequence has a length of 1 to 100 nt, such as 1 to 50 nt, such as 10 to 30 nt.

In some embodiments, the first immobilization sequence has a length of greater than 1 nt, such as greater than 10 nt. In some embodiments, the first immobilization sequence has a length of 10 to 200 nt. In some embodiments, the first immobilization sequence has a length of 20 to 100 nt, such as 20 to 50 nt.

In some embodiments, the second immobilization sequence has a length of greater than 1 nt, such as greater than 10 nt. In some embodiments, the second immobilization sequence has a length of 10 to 200 nt, for example, 10 to 100 nt, 10 to 50 nt, 10 to 30 nt, or 10 to 20 nt.

In a fourth aspect, the present invention provides a kit for detecting spatial information of a nucleic acid in a sample, comprising: (i) the nucleic acid array according to the third aspect, wherein the nucleic acid array does not comprise a second nucleic acid molecule; and, (ii) a second nucleic acid molecule, the second nucleic acid molecule in the direction from 5' to 3' comprises an immobilization region and a capture sequence;
the capture sequence can hybridize with the whole or part of a nucleic acid to be captured, and comprises: (a) an oligonucleotide sequence capable of capturing mRNA; and/or, (b) a random or degenerate oligonucleotide sequence; or, (c) a specific sequence for a specific target nucleic acid; and, the capture sequence has a free 3' end to enable the second nucleic acid molecule to function as an extension primer.

In some embodiments, the kit comprises: (i) a nucleic acid array, which comprises a solid support (e.g., a chip) with multiple kinds of carrier sequences attached to its surface, in which each kind of carrier sequence occupies a different position in the array, said each kind of carrier sequence comprises a plurality of copies of the carrier sequence, and the carrier sequence in the direction from 5' to 3' comprises a positioning sequence and a first immobilization sequence,
the positioning sequence has a unique nucleotide sequence corresponding to the position of the kind of carrier sequence on the array;
the first immobilization sequence allows annealing to its complementary nucleotide sequence and initiating an extension reaction;
the nucleic acid array also comprises a first nucleic acid molecule, the first nucleic acid molecule in the direction from 5' to 3' comprises: a complement of first immobilization sequence and a complement of positioning sequence, and hybridizes with the first immobilization sequence and the positioning sequence of the carrier sequence to form a double strand;
and, (ii) the second nucleic acid molecule, the immobilization region of which comprises a double-stranded DNA sequence.

It is easy to understand that a ligase can be used to ligate the second nucleic acid molecule described in (ii) to the first nucleic acid molecule contained in the nucleic acid array described in (i). Therefore, in certain embodiments, the kit further comprises a ligase.

In other embodiments, the kit comprises: (i) a nucleic acid array, which comprises a solid support (e.g., a chip) with multiple kinds of carrier sequences attached to its surface, in which each kind of carrier sequence occupies a different position in the array, said each kind of carrier sequence comprises a plurality of copies of the carrier sequence, and the carrier sequence in the direction from 5' to 3' comprises: a second immobilization sequence, a positioning sequence and a first immobilization sequence,
the second immobilization sequence allows annealing to its complementary nucleotide sequence;
the positioning sequence has a unique nucleotide sequence corresponding to the position of the kind of carrier sequence on the array;
the first immobilization sequence allows annealing to its complementary nucleotide sequence and initiating an extension reaction;
the nucleic acid array also comprises a first nucleic acid molecule, the first nucleic acid molecule in the direction from 5' to 3' comprises: a complement of first immobilization sequence and a complement of positioning sequence, and hybridizes with the first immobilization sequence and the positioning sequence of the carrier sequence to form a double strand;
and, (ii) the second nucleic acid molecule, the immobilization region of which comprises a complement of second immobilization sequence.

In certain embodiments, the second immobilization sequence is adjacent to the positioning sequence.

It is easy to understand that, under a condition that allows annealing, the second nucleic acid molecule described in (ii) can hybridize with a complementary region of the carrier sequence contained in the nucleic acid array described in (i), thus the second nucleic acid molecule can be ligated to the first nucleic acid molecule by using a ligase. Therefore, in certain embodiments, the kit further comprises a ligase.

In another aspect, the present invention also relates to a use of the nucleic acid array according to the third aspect or the kit according to the fourth aspect for detecting spatial information of a nucleic acid in a sample, or in the manufacture of a detection reagent for detecting spatial information of a nucleic acid in a sample.

In some embodiments, the spatial information of the nucleic acid comprises the location, distribution and/or expression of the nucleic acid.

In certain embodiments, the sample is a tissue sample, such as a tissue sample comprising cells. In some embodiments, the sample is a tissue section. In certain embodiments, the tissue section is prepared from a fixed tissue, for example, a formalin-fixed paraffin-embedded (FFPE) tissue or deep-frozen tissue.

In a fifth aspect, the present invention also relates to a nucleic acid array for detecting spatial information of a nucleic acid in a sample, which comprises a solid support (e.g., a chip) with multiple kinds of carrier sequences attached to its surface, in which each kind of carrier sequence occupies a different position in the array, said each kind of carrier sequence comprises a plurality of copies of the carrier sequence, and the carrier sequence in the direction from 5' to 3' comprises: a capture sequence template, a positioning sequence and a first immobilization sequence, wherein,

- the capture sequence template comprises a complementary sequence of a capture sequence, and the capture sequence can hybridize to the whole or part of a nucleic acid to be captured, including: (a) an oligonucleotide sequence capable of capturing mRNA; and/or, (b) a random or degenerate oligonucleotide sequence; or, (c) a specific sequence for a specific target nucleic acid;
- the positioning sequence has a unique nucleotide sequence corresponding to the position of the kind of carrier sequence on the array;
- the first immobilization sequence allows annealing to its complementary nucleotide sequence and initiating an extension reaction, and the first immobilization sequence also comprises a cleavage site, and the cleavage may be selected from enzymatic cleavage with nicking enzyme, enzymatic cleavage with USER enzyme, photocleavage, chemical cleavage or CRISPR-based cleavage;
- the nucleic acid array also comprises a first nucleic acid molecule (also referred to as a capture probe), and the first nucleic acid molecule in the direction from 5' to 3' comprises a binding region, a cleavage region, and a carrier sequence complementary region,
- the binding region comprises a linker capable of ligating to the surface of the solid support;
- the cleavage region comprises a cleavage site;
- the carrier sequence complementary region comprises a sequence that can be complementary to the carrier sequence, which in the direction from 5' to 3' comprises: a complement of first immobilization sequence, a complement of positioning sequence, and a capture sequence; and, the capture sequence has a free 3' end to enable the first nucleic acid molecule to function as an extension primer;
- and, the carrier sequence complementary region of the first nucleic acid molecule hybridizes with the carrier sequence to form a double strand.

In certain embodiments, the carrier sequence and the first nucleic acid molecule are single-stranded nucleic acid sequences. In some embodiments, the carrier sequence and the first nucleic acid molecule are single-stranded DNA sequences.

In certain embodiments, each copy of each kind of carrier sequence comprises the aforementioned first nucleic acid molecule hybridized therewith.

In some embodiments, the linker of the first nucleic acid molecule is a linking group capable of coupling with an activating group (e.g., NH$_2$), and the surface of the solid support is modified with the activating group (e.g., NH$_2$). In certain embodiments, the linker comprises —SH, -DBCO, or —NHS. In some embodiments, the linker is

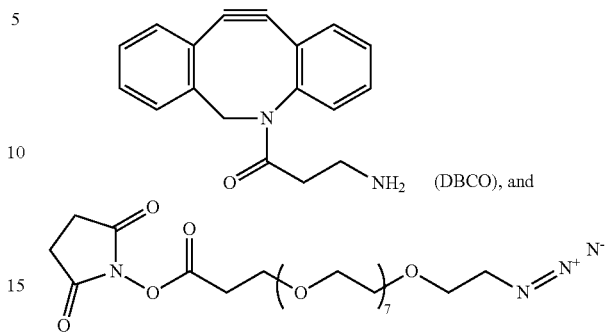

(Azido-dPEG®8-NHS ester) is attached to the surface of the solid support.

In some embodiments, the cleavage site contained in the first immobilization sequence is a nicking enzyme cleavage site. In some embodiments, the nicking enzyme is selected from USER, BamHI, BmtI and the like. In certain exemplary embodiments, the cleavage site is shown in SEQ ID NO: 14.

In some embodiments, the cleavage site contained in the cleavage region of the first nucleic acid molecule is a site where controlled cleavage can be performed by a chemical, enzymatic, or photochemical method. In certain embodiments, the cleavage site is an enzyme cleavage site. In some embodiments, the cleavage site is a USER enzyme cleavage site (UUU).

In some embodiments, the cleavage region of the first nucleic acid molecule is different from the cleavage site contained in the first immobilization sequence of the carrier sequence.

In certain embodiments, the nucleic acid array is prepared by the method described in the second aspect.

In some embodiments, the multiple copies of the carrier sequence are an amplification product formed by amplification of a complementary sequence of the carrier sequence as a template, and the amplification is selected from rolling circle amplification (RCA), bridge PCR amplification, multiple strand displacement amplification (MDA) or emulsion PCR amplification.

In certain embodiments, the multiple copies of the carrier sequence are a DNB formed by a concatemer of the carrier sequence. In certain embodiments, the multiple copies of the carrier sequence are a DNB formed by rolling circle amplification using a complementary sequence of the carrier sequence as a template.

In certain embodiments, the multiple copies of the carrier sequence are a DNA cluster formed by a clone population of the carrier sequence.

In some embodiments, the multiple copies of the carrier sequence are a DNA cluster formed by bridge PCR amplification using a complementary sequence of the carrier sequence as a template.

In some embodiments, the multiple copies of the carrier sequence are a DNA cluster formed by emulsion PCR amplification of a complementary sequence of the carrier sequence as a template.

In some embodiments, the multiple copies of the carrier sequence are a DNA cluster formed by multiple strand displacement amplification by using a complementary sequence of the carrier sequence as a template.

In some embodiments, the carrier sequence further comprises a complement of UMI sequence located downstream of the capture sequence template and upstream of the first immobilization sequence, the complement of UMI sequence is complementary to the UMI sequence, and the UMI sequence is a nucleotide sequence composed of at least 1 (for example, at least 2, at least 3, at least 4, or at least 5; for example, 5 to 100, 5 to 50, 5 to 20, such as 10) nucleotide N, and each N is independently any one of A, C, G and T;

and, the carrier sequence complementary region of the first nucleic acid molecule further comprises the UMI sequence located upstream of the capture sequence and downstream of the complement of first immobilization sequence.

In some embodiments, the complement of UMI sequence is located between the positioning sequence and the capture sequence template, or between the first immobilization sequence and the positioning sequence.

In some embodiments, each copy of each kind of carrier sequence (i.e., the carrier sequences comprising same positioning sequence) has a different complement of UMI sequence. Correspondingly, the first nucleic acid molecule (capture probe) hybridized with the carrier sequence of each copy also has a different UMI sequence.

In some embodiments, the carrier sequence is removed from the nucleic acid array through the cleavage site contained in the first immobilization sequence of the carrier sequence. In such embodiments, the nucleic acid array comprises a solid support (e.g., a chip) with multiple kinds of capture probes (first nucleic acid molecules) attached to its surface, and each kind of capture probe (first nucleic acid molecule) occupies a different position in the array, and is oriented to have free 3' end to enable the capture probe (first nucleic acid molecule) to function as an extension primer, wherein each kind of capture probe (first nucleic acid molecule) in the direction from 5' to 3' comprises: a binding region, an cleavage region, a complement of positioning sequence and a capture sequence, wherein, the binding region comprises a linker capable of ligating to the surface of the solid support;
the cleavage region comprises a cleavage site;
the positioning sequence corresponds to the position of the kind of capture probe on the array;
the capture sequence can hybridize with the whole or part of a nucleic acid to be captured, and comprises: (1a) an oligonucleotide sequence capable of capturing mRNA; and/or, (1b) a random or degenerate oligonucleotide sequence; or, (c) a specific sequence for a specific target nucleic acid.

In some embodiments, each capture probe of said each kind of capture probe (i.e., the capture probes comprising the same positioning sequence/complement of positioning sequence) has a different UMI sequence, and the UMI sequence is located upstream of the capture sequence and downstream of the cleavage region. In some embodiments, the UMI sequence is located at the 5' end of the capture sequence, for example between the capture sequence and the complement of positioning sequence. In other embodiments, the UMI sequence is located at the 5' end of the complement of positioning sequence, for example, between the cleavage region and the complement of positioning sequence.

In some embodiments, said each kind of carrier sequence (i.e., the carrier sequences comprising the same positioning sequence) or each kind of capture probe (i.e., the capture probes comprising the same positioning sequence/complement of positioning sequence) occupies an area (i.e., active region) having a diameter of less than 1 micrometer, for example, about 900 nanometers, about 800 nanometers, about 700 nanometers, about 600 nanometers, or about 500 nanometers, on the surface of the solid support. In certain embodiments, said each kind of carrier sequence or each kind of capture probe has an active region with a diameter of about 500 nanometers.

In certain embodiments, the solid support is a chip. In some embodiments, the solid support can be used as a sequencing platform. In some embodiments, the solid support is a sequencing chip (MGI), such as BGISEQ-500 platform. In some embodiments, the solid support is a high-density array chip, which can be obtained, for example, by the method described in patent CN103180496B.

In some embodiments, the first immobilization sequence has a length of greater than 1 bp, such as greater than 10 bp, or greater than 20 bp. In some embodiments, the first immobilization sequence has a length of 20 to 100 bp, such as 20 to 80 bp.

In some embodiments, the positioning sequence has a length of greater than 1 bp, such as greater than 10 bp. In some embodiments, the positioning sequence has a length of 10 to 100 bp, such as 10 to 50 bp, such as 10 to 30 bp, such as 20 bp.

In some embodiments, the oligonucleotide sequence capable of capturing mRNA comprises a sequence capable of hybridizing to a poly-A tail of the mRNA. In certain embodiments, the oligonucleotide sequence capable of capturing mRNA comprises a poly-T oligonucleotide sequence. In certain embodiments, the poly-T oligonucleotide sequence comprises at least 10 (e.g., at least 20) deoxythymidine residues.

In some embodiments, the capture sequence has a length of greater than 1 bp. In some embodiments, the capture sequence is 1 to 100 bp in length, such as 10 to 50 bp, such as 10 to 30 bp.

Detection Method

In a sixth aspect, the present invention provides a method for detecting spatial information of a nucleic acid in a sample, which comprises the following steps:

(1) providing the nucleic acid array according to the third aspect, or obtaining a nucleic acid array by the method according to the first aspect; wherein,
the nucleic acid array comprises multiple kinds of carrier sequences attached to a surface of a solid support (e.g., a chip), each kind of carrier sequence occupies a different position in the array, and said each kind of carrier sequence comprises a plurality of copies of the carrier sequence;
each copy of carrier sequence comprises a first nucleic acid molecule and a second nucleic acid molecule hybridized therewith, and the first nucleic acid molecule and the second nucleic acid molecule are not ligated to each other;
the first nucleic acid molecule comprises a complement of positioning sequence which is corresponding to the position of the kind of carrier sequence on the array,
the second nucleic acid molecule comprises a capture sequence capable of capturing the nucleic acid in the sample;

(2) contacting the nucleic acid array with the sample to be tested under a condition that allows annealing, so that the nucleic acid in the sample to be tested anneals to the capture sequence of the second nucleic acid molecule, and the position of the nucleic acid can be correlated with the position of the carrier sequence on the nucleic acid array;

(3) (i) ligating the first nucleic acid molecule and the second nucleic acid molecule that are hybridized to each copy of carrier sequence (for example, using a ligase);

performing a primer extension reaction by using the ligated first and second nucleic acid molecules as a primer, and using the captured nucleic acid molecule as a template under a condition that allows the primer extension, so as to produce an extension product, in which a strand that hybridizes with the captured nucleic acid molecule has the complement of positioning sequence contained in the first nucleic acid molecule as a spatial information tag; and/or, performing a primer extension reaction by using the captured nucleic acid molecule as a primer, and using the ligated first and second nucleic acid molecules as a template under a condition that allows the primer extension, so as to produce an extended captured nucleic acid molecule, in which the extended captured nucleic acid molecule has the positioning sequence as a spatial information tag;

alternatively, (ii) performing a primer extension reaction by using the second nucleic acid molecule as a primer and using the captured nucleic acid molecule as a template under a condition that allow the primer extension, so as to produce an extended second nucleic acid molecule, in which the extended second nucleic acid molecule comprises a complementary sequence of the captured nucleic acid; ligating the first nucleic acid molecule and the extended second nucleic acid molecule that are hybridized to the each copy of carrier sequence (for example, using a ligase), such that the extended second nucleic acid molecule which is ligated to the first nucleic acid molecule has the complement of positioning sequence contained in the first nucleic acid molecule as a spatial information tag;

(4) releasing at least part of the nucleic acid molecules with the spatial information tags from the surface of the array, wherein the part comprises the positioning sequence or its complementary strand and the captured nucleic acid molecule or its complementary strand; and (5) directly or indirectly analyzing the sequence information of the nucleic acid molecule released in step (4).

In such embodiments, before the target nucleic acid is captured in step (2), the first nucleic acid molecule is not ligated to the second nucleic acid molecule on the nucleic acid array.

In a seventh aspect, the present invention provides a method for detecting spatial information of a nucleic acid in a sample, which comprises the following steps:

(1) providing the nucleic acid array according to the first aspect, or obtaining a nucleic acid array by the method according to the third aspect; wherein, the nucleic acid array comprises multiple kinds of carrier sequences attached to a surface of a solid support (e.g., a chip), each kind of carrier sequence occupies a different position in the array, and said each kind of carrier sequence comprises a plurality of copies of the carrier sequence;

each copy of carrier sequence comprises a first nucleic acid molecule hybridized therewith, and the first nucleic acid molecule is ligated to a second nucleic acid molecule;

the first nucleic acid molecule comprises a complement of positioning sequence which is corresponding to the position of the kind of carrier sequence on the array, the second nucleic acid molecule comprises a capture sequence capable of capturing the nucleic acid in the sample;

(2) contacting the nucleic acid array with the sample to be tested under a condition that allows annealing, so that the nucleic acid in the sample to be tested anneals to the capture sequence of the second nucleic acid molecule, and the position of the nucleic acid can be correlated with the position of the carrier sequence on the nucleic acid array;

(3) (iii) perform a primer extension reaction by using the ligated first and second nucleic acid molecules as a primer, and using the captured nucleic acid molecule as a template under a condition that allows the primer extension, so as to produce an extension product, in which a strand hybridized with the captured nucleic acid molecule has the complement of positioning sequence contained in the first nucleic acid molecule as a spatial information tag; and/or, perform a primer extension reaction by using the captured nucleic acid molecule as a primer, and using the ligated first and second nucleic acid molecules as a template under a condition that allows the primer extension, so as to produce an extended captured nucleic acid molecule, in which the extended captured nucleic acid sequence has the positioning sequence as a spatial information tag;

(4) releasing at least part of the nucleic acid molecules with the spatial information tags from the surface of the array, wherein the part comprises the positioning sequence or its complementary strand and the captured nucleic acid molecule or its complementary strand; and (5) directly or indirectly analyzing the sequence information of the nucleic acid molecule released in step (4).

In such embodiments, before the target nucleic acid is captured in step (2), the first nucleic acid molecule has been ligated to the second nucleic acid molecule on the nucleic acid array.

In certain embodiments of the method of the sixth or seventh aspect, the multiple copies of the carrier sequence are a DNB formed by a concatemer of the carrier sequence, or the multiple copies of the carrier sequence is a DNA cluster formed by a clone population of the carrier sequence.

In certain embodiments of the method of the sixth or seventh aspect, the carrier sequence and the first nucleic acid molecule are single-stranded DNAs. In certain embodiments, the second nucleic acid molecule is single-stranded DNA or single-stranded RNA.

In an eighth aspect, the present invention provides a method for detecting spatial information of a nucleic acid in a sample, which comprises the following steps:

(1) providing the nucleic acid array according to the fifth aspect, or obtaining a nucleic acid array by the method according to the second aspect; wherein the nucleic acid array comprises multiple kinds of carrier sequences attached to a surface of a solid support (e.g., a chip), each kind of carrier sequence occupies a different position in the array, and said each kind of carrier sequence comprises multiple copies of the carrier sequence;

each copy of carrier sequence comprises a first nucleic acid molecule hybridized therewith, and the first nucleic acid molecule comprises a complement of positioning sequence which is corresponding to the position of the kind of carrier sequence on the array and a capture sequence capable of capturing the nucleic acid in the sample;

(2) contacting the nucleic acid array with the sample to be tested under a condition that allows annealing, so that the nucleic acid in the sample to be tested anneals to the capture sequence of the first nucleic acid molecule, and the position of the nucleic acid can be correlated with the position of the first nucleic acid molecule on the nucleic acid array;

(3) performing a primer extension reaction by using the first nucleic acid molecule as a primer and using the captured nucleic acid molecule as a template under a condition that allows the primer extension, so as to produce an extension product, in which a strand hybridized with the captured nucleic acid molecule has the complement of positioning sequence contained in the first nucleic acid molecule as a spatial information tag;

(4) releasing at least part of the nucleic acid molecules with the spatial information tags from the surface of the array, wherein the part comprises the positioning sequence or its complementary strand and the captured nucleic acid molecule or its complementary strand; and (5) directly or indirectly analyzing the sequence information of the nucleic acid molecule released in step (4).

In some embodiments, before step (2), the method further comprises performing cleavage at the cleavage site contained in the first immobilization sequence of the carrier sequence to digest the carrier sequence, and at the same time, ligating the first nucleic acid molecule (capture probe) to the surface of the solid support (e.g., a chip). In such embodiments, the nucleic acid array comprises multiple kinds of capture probes attached to the surface of the solid support (e.g., chip), each kind of capture probe occupies a different position in the array, and the capture probe comprises a complement of positioning sequence which is corresponding to the position of the kind of capture probe on the array and a capture sequence capable of capturing the nucleic acid in the sample;

(2) contacting the nucleic acid array with the sample to be tested under a condition that allows annealing, so that the nucleic acid in the sample to be tested anneals to the capture sequence of the capture probe, and the position of the nucleic acid can be correlated with the position of the capture probe on the array;

(3) performing a primer extension reaction by using the capture probe as a primer and using the captured nucleic acid molecule as a template under a condition that allows the primer extension, in which the resulting extension product comprises the complement of positioning sequence as a spatial information tag and a complementary sequence of the captured nucleic acid molecule, thereby generating a DNA molecule with spatial information tag; optionally, generating a complementary strand of the DNA molecule with spatial information tag, and/or optionally, amplifying the DNA molecule with spatial information tag;

(4) releasing at least part of the DNA molecules with spatial information tags and/or their complements or amplicons from the surface of the array, wherein the part comprises the spatial information tag or its complementary strand; and (5) directly or indirectly analyzing the sequence information of the nucleic acid molecule released in step (4).

In some embodiments of the method of the eighth aspect, the first nucleic acid molecule and the capture probe are DNA molecules, such as single-stranded DNAs.

In certain embodiments of the method of any one of the sixth to eighth aspects, the spatial information of the nucleic acid comprises the location, distribution and/or expression of the nucleic acid.

In certain embodiments of the method of any one of the sixth to eighth aspects, the sample is a tissue sample, such as a tissue section. In certain embodiments, the tissue section is prepared from a fixed tissue, for example, a formalin-fixed paraffin-embedded (FFPE) tissue or deep-frozen tissue.

In certain embodiments of the method of any one of the sixth to eighth aspects, the method is used for a non-diagnostic purpose.

In some embodiments of the method described in any one of the sixth to eighth aspects, any nucleic acid analysis method can be used in step (5). In certain embodiments, this step may comprise sequencing. In some embodiments, sequence-specific analysis methods can be used. For example a sequence-specific amplification reaction may be performed, for example using primers which are specific for the positioning domain and/or for a specific target sequence (e.g. a particular target DNA to be detected). An exemplary analysis method is a sequence-specific PCR reaction. Therefore, in certain embodiments, this step may comprise a sequence-specific PCR reaction.

In some embodiments of the method described in any one of the sixth to eighth aspects, the sequence analysis information obtained in step (5) can be used to obtain spatial information (i.e., location information) of the nucleic acid in the sample. In some embodiments, this spatial information may be derived from the nature of the sequence analysis information determined, for example it may reveal the presence of a particular nucleic acid which may itself be spatially informative in the context of the tissue sample used, and/or the spatial information (e.g., spatial localization) may be derived from the position of the tissue sample on the array, coupled with the sequencing information. Therefore, the method may involve simply correlating the sequence analysis information to a position in the tissue sample e.g. by virtue of the positioning tag and its correlation to a position in the tissue sample. In some embodiments, spatial information may conveniently be obtained by correlating the sequence analysis data to an image of the tissue sample. Therefore, in such embodiments, the method of any one of the sixth to eighth aspects further comprises step (6): correlating the sequence analysis information obtained in step (5) with an image of the sample, wherein the sample is imaged before or after step (3). In some embodiments, the imaging of the sample uses light, bright field, dark field, phase contrast, fluorescence, reflection, interference, confocal microscopy or a combination thereof.

In certain embodiments of the method of the sixth aspect, the method is used to detect a transcriptome in the sample. In such an embodiment, in step (3)(i), a cDNA molecule is generated from the captured RNA molecule by using the ligated first and second nucleic acid molecules as a reverse transcription primer, said cDNA molecule has the complement of positioning sequence contained in the first nucleic acid molecule as a spatial information tag, and optionally, the cDNA molecule is amplified; or, in step (3)(ii), a cDNA molecule is generated from the captured RNA molecule by using the second nucleic acid molecule as a reverse transcription primer, and the first nucleic acid molecule and the cDNA molecule which are hybridized to each carrier sequence are ligated (for example, using a ligase) to generate a cDNA molecule having the complement of positioning sequence contained in the first nucleic acid molecule as a spatial information tag, and optionally, the cDNA molecule is amplified; and, in step (4), at least part of the cDNA molecules and/or their amplicons are released from the surface of the array, wherein the released nucleic acid molecule may be the first and/or second strand of the cDNA molecule or an amplicon thereof, and wherein the part comprises the spatial information sequence or its complementary strand. In some embodiments, in step (1), the capture sequence comprises an oligonucleotide sequence capable of capturing mRNA.

In certain embodiments of the method of the seventh aspect, the method is used to detect a transcriptome in the sample. In such embodiments, in step (3)(iii), a cDNA molecule is generated from the captured RNA molecule by using the ligated first and second nucleic acid molecules as a reverse transcription primer, the cDNA molecule has the complement of positioning sequence contained in the first nucleic acid molecule as a spatial information tag, and optionally, the cDNA molecule is amplified; and, in step (4), at least part of the cDNA molecules and/or their amplicons are released from the surface of the array, wherein the released nucleic acid molecule may be the first and/or second strand of the cDNA molecule or an amplicon thereof, and wherein the part comprises the spatial information sequence or a complementary strand thereof. In some embodiments, in step (1), the capture sequence comprises an oligonucleotide sequence capable of capturing mRNA.

In certain embodiments of the method of the eighth aspect, the method is used to detect a transcriptome in the sample. In such an embodiment, in step (3), a cDNA molecule is generated from the captured RNA molecule by using the capture probe as an RT primer, the cDNA molecule has a spatial information tag, and optionally, the cDNA molecule is amplified; in step (4), at least part of the cDNA molecules and/or their amplicons are released from the surface of the array, wherein the released nucleic acid molecule may be the first and/or second strand of the cDNA molecule or an amplicon thereof, and wherein the part comprises the spatial information tag sequence or its complementary strand. In some embodiments, in step (1), the capture sequence comprises an oligonucleotide sequence capable of capturing mRNA.

In some embodiments of the method of any one of the sixth to eighth aspects, before or after the nucleic acid molecule (for example, DNA molecule) with spatial information tag or the cDNA molecule with spatial information tag is released from the surface of the array, the complementary strand or the second strand cDNA is generated.

The step for generating the second strand DNA (for example, cDNA) can be performed in situ on the array, either as a separate step of second strand synthesis, or in the initial step of an amplification reaction. Alternatively, the first strand DNA, e.g. cDNA (i.e., the strand generated by using the captured nucleic acid molecule as a template) can be released from the array, and then the second strand synthesis can be performed, e.g. in a reaction carried out in solution, whether as a separate step or in an amplification reaction.

When the second strand synthesis is performed on the array (i.e. in situ), the method may comprise an optional step of removing the captured nucleic acid molecule (e.g., RNA) before the second strand synthesis, for example, by using an RNA digesting enzyme (RNase) e.g. RNase H. Procedures for this are well known and described in the art. However, this step is generally unnecessary, and in most cases, RNA will degrade naturally. A step of removing the sample from the array generally also removes RNA from the array.

In some embodiments, the second strand of DNA (e.g., cDNA) is produced in a single reaction, and the second strand synthesis can be performed by any suitable method known in the art. For example, the first strand cDNA which is released from the array substrate, may be incubated with random primers, e.g. hexamer primers, and a DNA polymerase, e.g. a strand displacement polymerase, to perform a DNA synthesis reaction using the first strand as a template. Therefore, in certain embodiments, the synthesis of the complementary strand or the second strand uses a random primer and a strand displacement polymerase.

In some embodiments of the method according to any one of the sixth to eighth aspects, before the sequence analysis, a step of amplifying the nucleic acid molecules (e.g., DNA molecule) or cDNA molecules with the spatial information tags is further comprised. In some embodiments, the amplification step is performed after the nucleic acid molecules (e.g., DNA molecules) or cDNA molecules with the spatial information tags are released from the array, or the amplification step is performed in situ on the array (i.e., when the first nucleic acid molecules and/or carrier sequences and/or capture probes are still ligated to the surface of the solid support). In certain embodiments, the amplification step comprises PCR.

In some embodiments of the method described in any one of the sixth to eighth aspects, in step (4), the molecule is released from the surface of the array by the following method: (i) nucleic acid cleavage; (ii) denaturation; and/or (iii) physical method. In certain embodiments, the molecule is released by applying heated water or a buffer to the solid support.

In some embodiments, a step of purifying the released molecule is further comprised before sequencing.

In some embodiments, after the sample is contacted with the array and before step (3), a step of replenishing the sample with water is further comprised.

In some embodiments, before step (4), the method further comprises a step of washing the array to remove residual sample (e.g., tissue).

In certain embodiments, the array comprises at least one orientation marker to orient the sample on the array.

In some embodiments, in step (5), the sequence analysis step comprises a sequencing step. In some embodiments, the sequencing step comprises a sequencing reaction based on reversible dye-terminators.

The method for detecting nucleic acid spatial information according to any one of the sixth to eighth aspects of the present invention can be used for RNA detection, transcriptome analysis, DNA detection, genome analysis, and the like. Spatial information is of great significance to transcriptomics and genomics related researches, especially useful in the study of transcriptomic or genomic variation in different cells or regions of tissues, such as comparative study of normal and diseased cells or tissues, or study of transcriptomic or genomic changes during disease process, etc.

For example, the pathophysiological analysis of Alzheimer's disease shows that its pathological process involves the interaction of neurons and glial cells, and the related transcriptome and epigenome studies have also found that the brain of patient with Alzheimer's disease has severely damaged neuronal function and abnormality in innate immune response. However, population-level research cannot reveal the complexity of changes between cells and within cell populations, especially for those rare cell types. Ordinary researches at single-cell level cannot distinguish the characteristics of specific cell types in different tissue regions at the same period and the changes in cell composition during neurodegeneration. Therefore, in order to further reveal the pathogenic mechanism and development mode of diseases, it is urgent to obtain single-cell transcriptome information with spatial dimensions.

The method for detecting nucleic acid spatial information according to any one of the sixth to eighth aspects of the present invention can immobilize the nucleic acid molecules in different regions of brain tissue sample to a chip through the capture sequence with position tag that is ligated to the chip, and perform sequencing, so that transcriptome results comprising accurate location information are obtained to realize the detection of changes in specific cell types in different regions during the progress of Alzheimer's disease. In particular, since the active region of DNB or DNA cluster on the chip of the present invention is of a grade as low as nanometers, while the cell diameter is about 12 um, the chip of the present invention can obtain spatial positioning information with subcellular resolution.

The present invention also comprises the following exemplary embodiments:

Item 1. A method for generating a nucleic acid array, the nucleic acid array is used to detect spatial information of a biomolecule (e.g., a nucleic acid) in a sample, the method comprising the following steps:
(1) providing a circular nucleic acid template, the circular nucleic acid template comprises a template sequence of a kind of capture probe, and the template sequence in the direction from 5' to 3' comprises a linker region, a spatial tag region, and a capture region; wherein,
the linker region comprises a cleavage site, and the cleavage may be selected from enzymatic cleavage with nicking enzyme, enzymatic cleavage with USER enzyme, photocleavage, chemical cleavage or CRISPR-based cleavage;
the spatial tag region comprises a spatial tag sequence, and the spatial tag sequence corresponds to the position of the kind of capture probe on the array;
the capture region comprises a capture sequence capable of capturing the biomolecule (e.g., nucleic acid) in the sample; wherein, the capture sequence comprises: (1a) an oligonucleotide sequence capable of capturing a mRNA; and/or, (1b) a random or degenerate oligonucleotide sequence; or, (c) a specific sequence for a specific target molecule (e.g., a target nucleic acid);
(2) performing rolling circle amplification (RCA) by using the circular nucleic acid template as a template to obtain a DNA nanoball (DNB) which is formed by a concatemer of a complementary sequence of the template sequence (i.e., template complementary sequence);
(3) ligating the DNB to a surface of a solid support (e.g., a chip);
(4) providing a probe primer, and using the template complementary sequence contained in the DNB as a template to perform a primer extension reaction to produce an extension product, wherein a strand hybridized to the template complementary sequence is a capture probe; optionally, amplifying the extension product; in which the probe primer in the direction from 5' to 3' comprises a binding region, an cleavage region and a primer linker region; wherein,
the binding region comprises a linker that can be ligated to the surface of the solid support;
the cleavage region comprises a cleavage site;
the primer linker region is complementary to the whole or part of the sequence of the linker region of the template complementary sequence contained in the DNB (i.e.,
the complementary sequence of the linker region of the template sequence), and has a free 3' end to enable the probe primer to function as a primer and initiate an extension reaction; preferably, the primer linker region comprises a sequence of the linker region of the template sequence or a fragment thereof;
(5) ligating the probe primer to the surface of the solid support; wherein, steps (4) and (5) are performed in any order;
(6) performing cleavage at the cleavage site contained in the linker region to digest the DNB, so that the extension product in step (4) is separated from the template DNB that forms the extension product, thereby ligating the capture probe to the surface of the solid support (e.g., chip);
preferably, the circular nucleic acid template, DNB and capture probe are DNA;
preferably, multiple kinds of circular nucleic acid templates are provided in step (1), and each kind of circular nucleic acid template comprises a different template sequence of capture probe, so as to obtain a solid support (e.g., chip) with multiple kinds of capture probes attached to its surface.

Item 2. The method according to Item 1, wherein the cleavage site contained in the linker region is a cleavage site for nicking enzyme;
preferably, the nicking enzyme is selected from USER, BamHI, and BmtI.

Item 3. The method according to item 1 or 2, wherein the linker region further comprises a sequencing primer hybridization region and/or an amplification primer hybridization region; wherein the sequencing primer hybridization region allows annealing to a sequencing primer and initiating a sequencing reaction, and the amplification primer hybridization region allows annealing to an amplification primer and initiating an extension and amplification reaction.

Item 4. The method according to any one of items 1 to 3, wherein the oligonucleotide sequence capable of capturing mRNA comprises a sequence capable of hybridizing with a poly-A tail of the mRNA;
preferably, the oligonucleotide sequence capable of capturing mRNA comprises a poly-T oligonucleotide sequence;
preferably, the poly-T oligonucleotide sequence comprises at least 10 (for example, at least 20) deoxythymidine residues.

Item 5. The method according to any one of items 1 to 4, wherein the template sequence further comprises a probe tag region located upstream of the capture region and downstream of the linker region, and the probe tag region comprises a probe tag complementary sequence which is composed of modified bases, and the modified bases are capable of complementary pairing by hydrogen bonds with multiple kinds of main bases (e.g., C, G, A, T, U);
preferably, the probe tag region is located between the spatial tag region and the capture region, or between the linker region and the spatial tag region;
preferably, the probe tag complementary sequence comprises a plurality of (for example, at least 10) Inosines.

Item 6. The method according to any one of items 1 to 5, which has one or more of the following characteristics:
(i) the linker region has a length of greater than 1 bp, for example, greater than 10 bp, or greater than 20 bp; preferably, the linker region has a length of 20 to 100 bp;

(ii) the spatial tag region has a length of greater than 1 bp, for example, greater than 10 bp; preferably, the spatial tag region has a length of 10 to 100 bp;
(iii) the capture region has a length of greater than 1 bp; preferably, the capture region has a length of 1-100 bp;
(iv) the probe tag region has a length of greater than 1 bp, for example, greater than 5 bp; preferably, the probe tag region has a length of 5-100 bp.

Item 7. The method according to any one of items 1 to 6, wherein the solid support is a chip;
preferably, the solid support can be used as a sequencing platform, such as a sequencing chip.

Item 8. The method according to any one of items 1 to 7, wherein, in step (4), the complementary sequence of the spatial tag sequence is sequenced while the primer extension reaction is performed, so as to obtain the sequence information of the spatial tag sequence contained in the corresponding capture probe.

Item 9. The method according to any one of items 1 to 7, wherein, before step (4), a step of sequencing the complementary sequence of the spatial tag sequence contained in the DNB is further comprised;
preferably, after the sequencing is completed, dNTP added to the synthetic strand due to the sequencing is removed by washing.

Item 10. The method according to any one of items 1 to 9, wherein the linker is a linking group capable of coupling with an activated group (e.g., $NH_2$), and the solid support is modified by the activated group (e.g., $NH_2$) on its surface;
preferably, the linker comprises —SH, -DBCO or —NHS;
preferably, the linker is

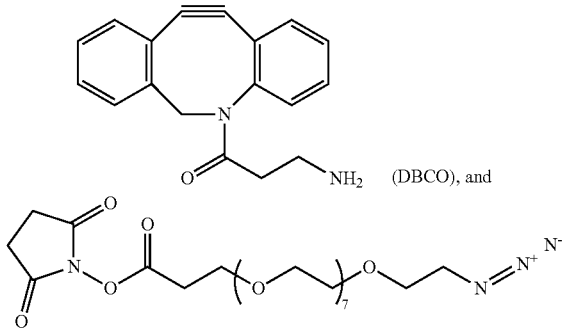

(Azido-dPEG®8-NHS ester) is attached to the surface of the solid support.

Item 11. The method according to any one of items 1 to 10, wherein the cleavage site contained in the cleavage region is a site where controlled cleavage can be performed by a chemical, enzymatic or photochemical method;
preferably, the cleavage site is an enzyme cleavage site;
preferably, the cleavage sites contained in the cleavage region and the linker region are different.

Item 12. The method according to any one of items 1 to 11, wherein the amplification comprises PCR.

Item 13. A nucleic acid array prepared by the method according to any one of items 1 to 12.

Item 14. A nucleic acid array for detecting spatial information of a biomolecule (e.g., a nucleic acid) in a sample, which comprises a solid support (e.g., a chip) with multiple kinds of capture probes attached to its surface, in which each kind of capture probe occupies a different position in the array and is oriented to have free 3' end to enable the capture probe to function as an extension primer, wherein each kind of capture probe in the direction from 5' to 3' comprises: a binding region, an cleavage region, a spatial tag sequence and a capture sequence, wherein,
the binding region comprises a linker that can be ligated to the surface of the solid support;
the cleavage region comprises a cleavage site;
the spatial tag sequence corresponds to the position of the kind of capture probe on the array;
the capture sequence is capable of hybridizing with the whole or part of the biomolecule (e.g., nucleic acid) to be captured, and comprises: (1a) an oligonucleotide sequence capable of capturing mRNA; and/or, (1b) a random or degenerate oligonucleotide sequence; or, (c) a specific sequence for a specific target molecule (e.g., a target nucleic acid).

Item 15. The nucleic acid array according to Item 14, wherein each capture probe of the each kind of capture probe (i.e., capture probes comprising the same spatial tag sequence) has a different probe tag sequence, and the probe tag sequence is located upstream of the capture sequence and downstream of the cleavage region;
preferably, the probe tag sequence is located between the capture sequence and the spatial tag sequence, or between the cleavage region and the spatial tag sequence.

Item 16. The nucleic acid array according to Item 14 or 15, wherein the each kind of capture probe (i.e., capture probes comprising the same spatial tag sequence) occupies an area (i.e., active region) with a diameter of less than 1 micron on the surface of the solid support;
preferably, the each kind of capture probe occupies an active region with a diameter of about 500 nanometers.

Item 17. The nucleic acid array according to any one of items 14 to 16, wherein the solid support is a chip;
preferably, the solid support can be used as a sequencing platform, such as a sequencing chip.

Item 18. The nucleic acid array according to any one of items 14 to 17, wherein the nucleic acid array is prepared by the method according to any one of items 1 to 12.

Item 19. A method for detecting spatial information of a biomolecule in a sample, which comprises the following steps:
(1) providing the nucleic acid array according to any one of items 13 to 18, or obtaining a nucleic acid array by the method according to any one of items 1 to 12; the nucleic acid array comprises multiple kinds of capture probes attached to a surface of a solid support (e.g., a chip), each kind of capture probe occupies a different position in the array, and the capture probe comprises a spatial tag sequence corresponding to the position of the kind of capture probe on the array and a capture sequence capable of capturing a biomolecule in a sample;
(2) contacting the nucleic acid array with the sample to be tested, so that the capture sequence of the capture probe binds to the biomolecule in the sample to be tested, and thus the position of the biomolecule can be correlated with the position of the capture probe on the nucleic acid array, and a biomolecule labeled by spatial tag is generated;
(3) releasing the biomolecule labeled by spatial tag from the surface of the array; and
(4) directly or indirectly analyzing the sequence of the biomolecule released in step (3).

Item 20. A method for detecting spatial information of a nucleic acid in a sample, which comprises the following steps:
  (1) providing the nucleic acid array according to any one of items 13 to 18, or obtaining a nucleic acid array by the method according to any one of items 1 to 12; the nucleic acid array comprises multiple kinds of capture probes attached to a surface of a solid support (e.g., a chip), each kind of capture probe occupies a different position in the array, and the capture probe comprises a spatial tag sequence corresponding to the position of the kind of capture probe on the array and a capture sequence capable of capturing the nucleic acid in the sample;
  (2) contacting the nucleic acid array with the sample to be tested under a condition that allows annealing, so that the nucleic acid in the sample to be tested anneal to the capture sequence of the capture probe, and thus the position of the nucleic acid can be correlated with the position of the capture probe on the array;
  (3) using the capture probe as a primer and using the captured nucleic acid molecule as a template to perform a primer extension reaction under a condition that allows the primer extension, the resulting extension product comprises the spatial tag sequence and a complementary sequence of the captured nucleic acid molecule, thereby generating a DNA molecule labeled with spatial tag; optionally, generating a complementary strand of the DNA molecule labeled with spatial tag, and/or optionally, amplifying the DNA molecule labeled with spatial tag;
  (4) releasing at least part of the DNA molecules labeled with spatial tags and/or their complementary strands or amplicons from the surface of the array, wherein the part comprises the spatial tag sequence or its complementary strand; and
  (5) directly or indirectly analyzing the sequence of the nucleic acid molecule released in step (4);
  preferably, the spatial information of the nucleic acid comprises the location, distribution and/or expression of the nucleic acid;
  preferably, the capture probe is a DNA molecule;
  preferably, the sample is a tissue sample, such as a tissue section;
  preferably, the tissue section is prepared from a fixed tissue, for example, a formalin-fixed paraffin-embedded (FFPE) tissue or deep-frozen tissue.

Item 21. The method according to Item 20, wherein in step (5), the sequence analysis comprises a sequencing or sequence-specific PCR reaction.

Item 22. The method according to Item 20 or 21, wherein the method further comprises step (6): correlating the sequence analysis information obtained in step (5) with an image of the sample, wherein the sample is imaged before or after step (3).

Item 23. The method according to any one of items 20 to 22, wherein the method is used for detecting a transcriptome in the sample, wherein:
  in step (3), using the capture probe as a RT primer to synthesize a cDNA molecule from the captured RNA molecule, in which the cDNA molecule is labeled with a spatial tag, and optionally, the cDNA molecule is amplified;
  in step (4), at least part of the cDNA molecules and/or their amplicons is released from the surface of the array, wherein the released nucleic acid molecule may be a first and/or second strand of the cDNA molecule or an amplicon thereof, and wherein the part comprises a spatial tag sequence or its complementary strand;
  preferably, in step (1), the capture sequence comprises an oligonucleotide sequence capable of capturing mRNA.

Item 24. The method according to any one of items 20 to 23, wherein before or after the DNA molecule labeled with spatial tag or the cDNA molecule labeled with spatial tag is released from the surface of the array, the complementary strand or the cDNA second strand is generated;
  preferably, the synthesis of the complementary strand or second strand uses a random primer and a strand displacement polymerase.

Item 25. The method according to any one of items 20 to 24, wherein, before the sequence analysis, it further comprises a step of amplifying the DNA molecule or cDNA molecule that is labeled with spatial tag;
  preferably, the amplification step is performed after the DNA or cDNA molecule labeled with spatial tag is released from the array, or the amplification step is performed in situ on the array;
  preferably, the amplification step comprises PCR.

Item 26. The method according to any one of items 20 to 25, wherein the sequence analysis further comprises a step of purifying the released molecule.

Item 27. The method according to any one of items 20 to 26, before step (4), the method further comprises a step of washing the array to remove a residue of the sample (for example, tissue).

Item 28. The method according to any one of items 20 to 27, in step (4), the molecule is released from the surface of the array by the following method: (i) nucleic acid cleavage; (ii) denaturation; and/or (iii) physical method;
  preferably, the molecule is released from the cleavage region of the capture probe by enzyme cleavage.

Item 29. The method according to any one of items 20 to 28, in step (6), the sample is imaged by using light, bright field, dark field, phase contrast, fluorescence, reflection, interference, confocal microscopy or a combination thereof.

BENEFICIAL EFFECT

The present invention provides a novel array for detecting spatial information of nucleic acid and a preparation method thereof. When the nucleic acid array is applied to the detection of spatial information of nucleic acid, high-precision subcellular positioning and high-throughput tissue positioning can be realized at the same time. The array of the present invention and the detection method based on the array have great application value in cell positioning, subcellular positioning, organelle positioning, cell interaction, organelle interaction, molecular pathway research, disease diagnosis and the like.

EXAMPLES

Figure 1:
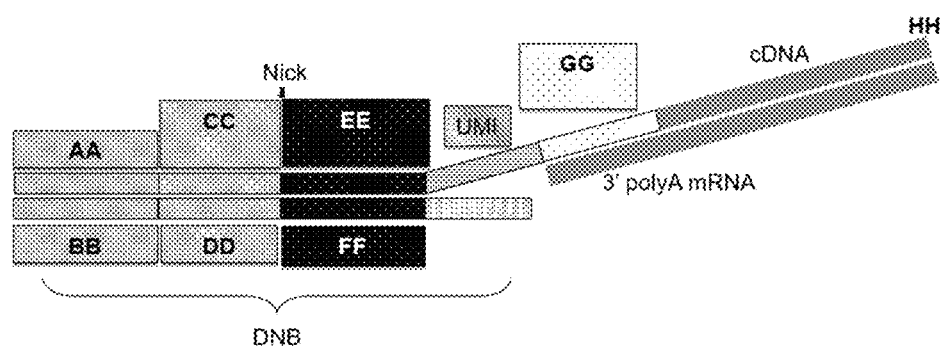
FIG. 1 shows a schematic diagram of cDNA synthesis after capturing mRNA in Example 2.

The present invention is now described with reference to the following examples which are intended to illustrate the invention rather than limit the invention.

Unless otherwise specified, the experiments and methods described in the examples were basically performed according to conventional methods well known in the art and described in various references. In addition, for those without specific conditions in the examples, they were carried out in accordance with the conventional conditions or the conditions recommended by the manufacturer. The reagents or instruments used without the manufacturer's indication were all conventional products that were purchased commercially. Those skilled in the art know that the examples describe the present invention by way of example, and are not intended to limit the scope of protection claimed by the present invention. All publications and other references mentioned in herein are incorporated by reference in their entirety.

Example 1. Preparation of Capture Chip (1)

1. The following DNA library sequence was designed and synthesized. The sequence synthesis was performed by Beijing Liuhe BGI.

5'-phosphorylated-AAGTCGGAGGCCAAGCGGTCT-TAGGAAGACAA (Linker A, SEQ ID NO: 1) NNNNNNNNNNNNNNNNNNNNNNNNNN (complement of positioning sequence, N represented any base, such as C, G, A or T) CTGATAAGGTCGCCA (complement of second immobilization sequence, SEQ ID NO: 2) CAACTCCTTGGCTCACAGAACGACATGGCTAC-GATCCGACTT (Linker B, SEQ ID NO: 3)-3'. Wherein, Linker A comprised a part of the complement of first immobilization sequence and a circularization site, and Linker B comprised another part of the complement of first immobilization sequence, a cleavage site, and a circularization site.

2. In situ amplification of library

Preparation of DNA nanoball (DNB): 40 ul of the following reaction system was prepared, and 80 fmol of the above DNA library was added, in which the DNB primer has a sequence of GGCCTCCGACTTAAGTCGGATCGT (SEQ ID NO: 4) and synthesized by Beijing Liuhe BGI.

| Ingredient | Volume (ul) | Final concentration |
|---|---|---|
| DNA library sequence | 80 fmol (X) | |
| 10× phi29 buffer (produced by BGI) | 4 | 1× |
| DNB primer sequence, 10 uM | 4 | 1 uM |
| H₂O | 32-x | |

The above reaction system was placed in a PCR machine for reaction. The reaction conditions were as follows: 95° C. for 3 min, 40° C. for 3 min; after the reaction, it was placed on ice, added with 40 ul of mixed enzyme I and 2 ul of mixed enzyme II required to prepare DNB in DNBSEQ sequencing kit, as well as 1 ul of ATP (100 mM mother liquor, Thermo Fisher), and 0.1 ul of T4 ligase (produced by BGI). After mixing well, the above reaction system was transferred to a PCR machine at 30° C. and reacted for 20 minutes to form DNB. The DNB was loaded on BGISEQ500 sequencing chip according to the method described in the BGISEQ500 SE50 kit.

3. Sequencing and decoding of the positioning sequence: According to the instructions of the BGISEQ500 SE50 sequencing kit, the positioning sequence is decoded and sequenced, with a sequencing length of 25 bp. The fq file formed by sequencing was stored for later use.

4. Immobilizing capture sequence: the following DNA sequence was synthesized by Beijing Liuhe BGI: 5'-phosphorylated-CTGATAAGGTCGCCA (complement of second immobilization sequence, SEQ ID NO: 5) NNNNNNNNNN(UMI)TTTTTTTTTTTTTTTTTTTTVN (capture sequence, SEQ ID NO: 6)-3', wherein N represented any base (for example, C, G, A, or T). The sequencing chip was taken from the sequencer, the cleavage reagent of Hole 7 of the BGISEQ500 SE50 kit was pumped into the chip (it was ensured that the reagent covered the entire chip and no bubbles were generated). The chip was allowed to stand at 60° C., and reaction was performed for 10 minutes. After the reaction, an appropriate amount of 5×SSC (purchased from Shanghai Shenggong) was pumped into the sequencing chip to replace the previous reagent in the chip. The capture sequence was diluted with 5×SSC to 1 uM, and an appropriate amount of the diluted capture sequence was added to the chip, so that the chip was filled with the capture sequence. The chip was allowed to stand for about 30 minutes at room temperature so that the capture sequence fully hybridized with the DNB.

5. Chip dicing: The prepared chip was cut into several small slices, in which the size of the slices was adjusted according to the needs of the experiment, and the chip was immersed in 50 mM tris buffer with pH8.0, and stored at 4° C. for later use.

Example 2. Capture of Tissue mRNA and cDNA Synthesis

1. Frozen tissue section. The cerebellar tissue sections of mice were made according to the standard procedure of frozen section.

2. mRNA capture. According to the size of the tissue section, the chip with suitable size prepared in Example 1 was taken and placed at room temperature. After the liquid on the chip was evaporated, the tissue section was attached to the capture chip by virtue of the temperature difference between the tissue section and the chip in the tissue chopper. The attached tissue section was placed at room temperature, 5×SSC reaction solution was added to the chip (and fully covered the region to which the tissue attached), and reaction was performed at 30° C. for 30 minutes to allow the mRNA in the tissue to fully hybridize with the capture region on the chip.

3. cDNA synthesis. 5×SSC was used to wash the chip twice at room temperature, 200 ul of the following reverse transcriptase reaction system was prepared, the reaction solution was added to the chip to fully cover it, reaction was performed at 42° C. for 90 min to 180 min. The mRNA would use polyT as primer to perform cDNA synthesis, the 3' end of mRNA carried TSO tag (AAGTCGGAGGC-CAAGCGGTC/rG//rG//iXNA_G/) (SEQ ID NO: 7) for the synthesis of cDNA complementary strand. The structure diagram of the above process was shown in FIG. 1.

| Ingredient | Volume (ul) | Final concentration |
| --- | --- | --- |
| Superscript II First strand buffer (5×), Thermo Fisher | 40 | 1× |
| Betaine (5M), Aladdin | 40 | 1M |
| dNTP (10 mM), Thermo Fisher | 20 | 1 mM |
| MgCl$_2$ (100 mM), Aladdin | 15 | 7.5 mM |
| TSO sequence (50 uM), synthesized by Beijing Liuhe BGI | 10 | 1 uM |
| Superscript II RT (200 U/ul), Thermo Fisher | 10 | 10 U/ul |

-continued

| Ingredient | Volume (ul) | Final concentration |
| --- | --- | --- |
| DTT(100 mM) | 10 | 5 mM |
| RNase inhibitor (40 U/ul), Thermo Fisher | 5 | 1 u/ul |
| Nucleic acid-free molecular water (NF H$_2$O) | 50 | |

4. Ligating spatial positioning region to capture region. After cDNA synthesis, the chip was washed twice with 5×SSC. 1 ml of the following ligation reaction system was prepared, an appropriate volume thereof was pumped into the chip to ensure that the chip was filled with the following ligation reaction solution, and the nick shown in FIG. 1 was ligated. Reaction was performed at room temperature for 30 minutes. After the reaction, the chip was washed with 5×SSC at a temperature of 55° C. for 3 times, 5 min for each time.

| Ingredient | Volume (ul) | Concentration |
| --- | --- | --- |
| 10× T4 ligase buffer (produced by BGI) | 100 | 1× |
| T4 ligase (600 U/ul, produced by BGI) | 100 | 60 u/ul |
| Glycerin (Aladdin) | 10 | 10% |
| H$_2$O | 790 | |

Figure 2:
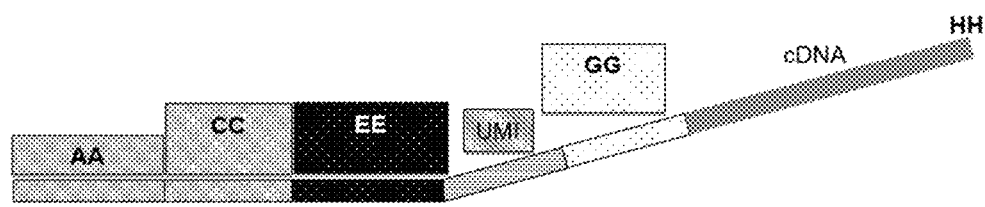
FIG. 2 shows a schematic diagram of the molecule released from the chip in Example 2.

5. cDNA release. After first strand of cDNA was synthesized on the chip, an appropriate amount of formamide solution was added to the chip and reacted at 55° C. for 10 minutes to release the cDNA strand from the chip. The released molecule had the structure shown in FIG. 2. The reaction solution released from the chip was collected, 2×XP magnetic beads were used to purify the cDNA strand, and finally 45 ul of TE buffer (Thermo Fisher) was used to recover the product. The qubit ssDNA detection kit was used to quantitatively detect single-stranded cDNA.

6. cDNA amplification. 100 ul of the following reaction system was prepared:

| Ingredient | Volume (ul) | Concentration |
| --- | --- | --- |
| recovery product of cDNA first strand | 42 | |
| Rolling circle amplification primer AAGTCGGAGGCCAAGCGGTC (with 5'-phosphorylation, SEQ ID NO: 8, 10 uM) (Beijing Liuhe BGI) | 8 | 0.8 uM |
| 2x HiFi (produced by BGI) | 50 | 1x |

Figure 3:
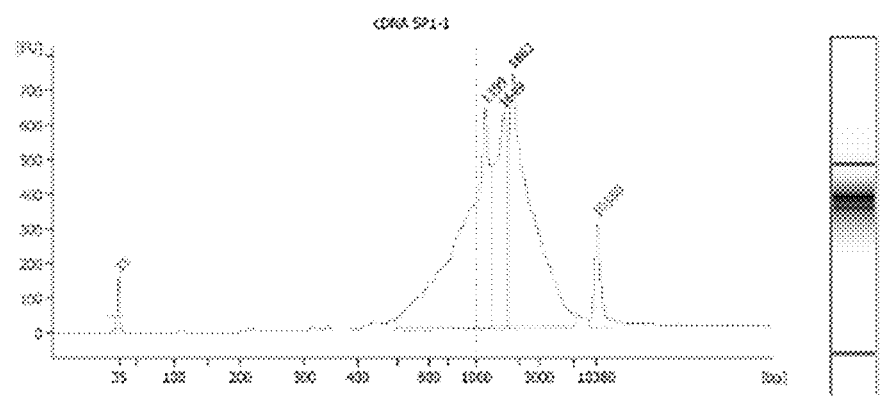
FIG. 3 shows the results of the 2100 detection of cDNA fragment distribution in Example 2.

The above reaction system was placed in the PCR machine, and the following reaction program was set: 95° C. for 3 min, 11 cycles (98° C. for 20 s, 58° C. for 20 s, 72° C. for 3 min), 72° C. for 5 min, 4° C. for ∞. After the reaction was completed, XP beads were used to purify and recover. The qubit kit was used to quantify the concentration of dsDNA, and the 2100 was used to detect the distribution of cDNA fragments. The 2100 detection results were shown in FIG. 3. The cDNA length was normal.

Example 3. Construction and Sequencing of cDNA Library

1. Tn5 interruption. According to the cDNA concentration, 20 ng of cDNA was added with 0.5 uM of Tn5 enzyme and corresponding buffer (the coating method for Tn5 enzyme was performed according to stLFR library construction kit), and mixed well to form 20 ul of reaction system. The reaction was performed at 55° C. for 10 min, 5 ul of 0.1% SDS was added and mixed well at room temperature for 5 minutes to end the Tn5 interruption step.

2. PCR amplification. 100 ul of the following reaction system was prepared:

| Ingredient | Volume (ul) | Concentration |
| --- | --- | --- |
| Product after Tn5 interruption | 25 | |
| 2x Hifi ready mix (produced by BGI) | 50 | 0.8 uM |

-continued

| Ingredient | Volume (ul) | Concentration |
|---|---|---|
| Primer AAGTCGGAGGCCAAGCGGTC (5-phosphorylation modification, SEQ ID NO: 9, 10 uM) (Beijing Liuhe BGI) | 4 | 0.4 uM |
| Primer GAGACGTTCTCGACTCAGAAGATG (SEQ ID NO: 10) (synthesized by Beijing Liuhe BGI) | 4 | 0.4 uM |
| NF H$_2$O | 17 | |

After mixing, it was placed in PCR machine, the following program was set: 95° C. 3 min, 11 cycles (98° C. for 20 s, 58° C. for 20 s, 72° C. for 3 min), 72° C. for 5 min, 4° C. for ∞. After the reaction was completed, XP beads were used to purify and recover. The qubit kit was used to quantify dsDNA concentration.

3. Sequencing. 80 fmol of the amplified product after the above interruption was taken to prepare DNB. 40 ul of the following reaction system was prepared:

| Ingredient | Volume (ul) | Final concentration |
|---|---|---|
| Amplification product after the above interruption | 80 fmol (X) | |
| 10x phi29 buffer (produced by BGI) | 4 | 1X |
| DNB primer sequence 10 uM (GGCCTCCGACTTGAGACGTTCTCG, SEQ ID NO: 11) (synthesized by Beijing Liuhe BGI) | 4 | 1 uM |
| H$_2$O | 32-x | |

The above reaction system was placed in the PCR machine for reaction, and the reaction conditions were as follows: 95° C. for 3 min, 40° C. for 3 min. After the reaction was completed, it was placed on ice, added with 40 ul of mixed enzyme I and 2 ul of mixed enzyme II required to prepare DNB in DNBSEQ sequencing kit, as well as 1 ul of ATP (100 mM mother liquor, Thermo Fisher), 0.1 ul of T4 ligase (produced by BGI). After mixing well, the above reaction system was transferred to PCR machine at 30° C. and reacted for 20 minutes to form DNB. The DNB was loaded on the sequencing chip of MGISEQ2000 according to the method described in the PESO kit of MGISEQ2000, and the sequencing was performed according to the relevant instructions with the PESO sequencing model, wherein the sequencing of first strand was divided into two stages, i.e., sequencing 25 bp and then performing 15 cycles of dark reaction, then sequencing 10 bp UMI sequence, and 50 bp was sequenced for second strand.

Data Analysis

Figure 4:
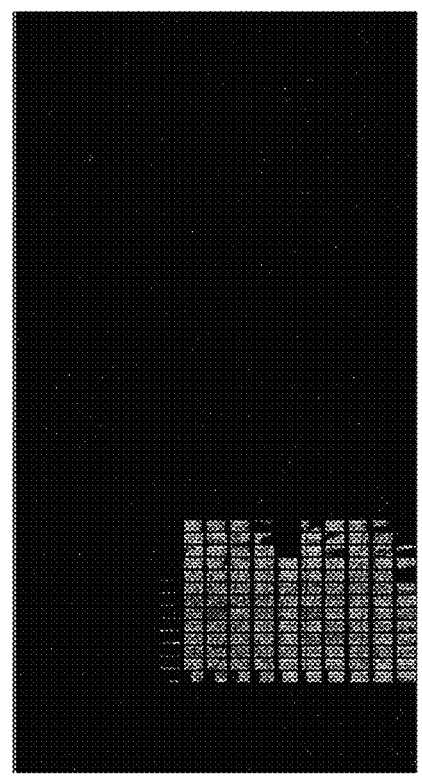
FIG. 4 shows the matching result of the 25 bp sequence of first strand obtained by cDNA sequencing in Example 3 and the fq of the positioning sequence on the capture chip.

1. The 25 bp sequence of first strand obtained by cDNA sequencing was matched with the fq of the positioning sequence on the capture chip (the sequencing result obtained in step 3 in Example 1) by alignment. The matching result was shown in FIG. 4, in which the bright area represented the region where the 25 bp of cDNA sequencing exactly matched the capture chip, and this region represented the region on the capture chip for tissue capture. It showed that the capture chip could use the spatial positioning region to accurately locate the tissue capture region.

Figure 5:
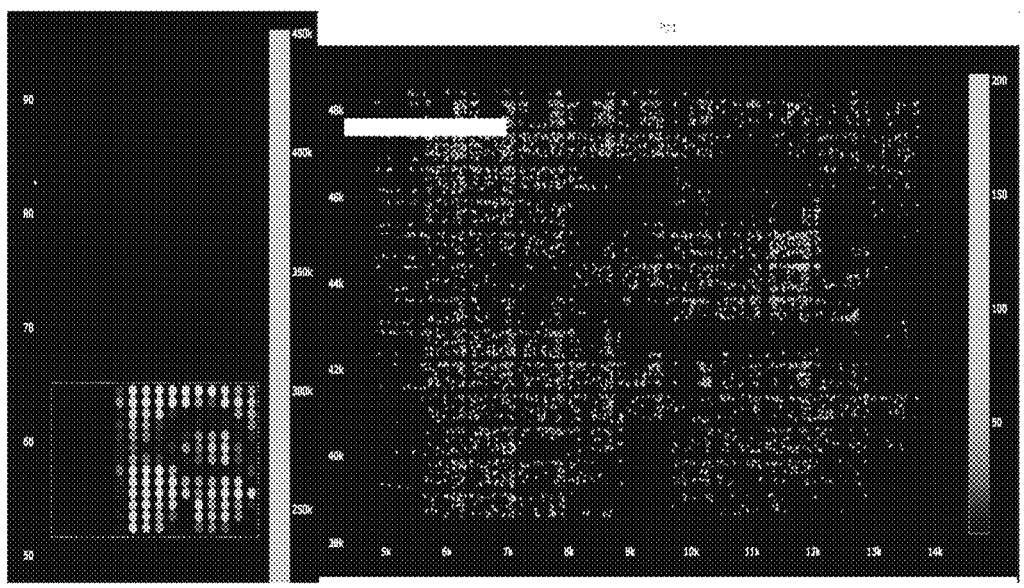
FIG. 5 shows a graph of the expression of mRNA in the tissue section in Example 3.
Figure 6:
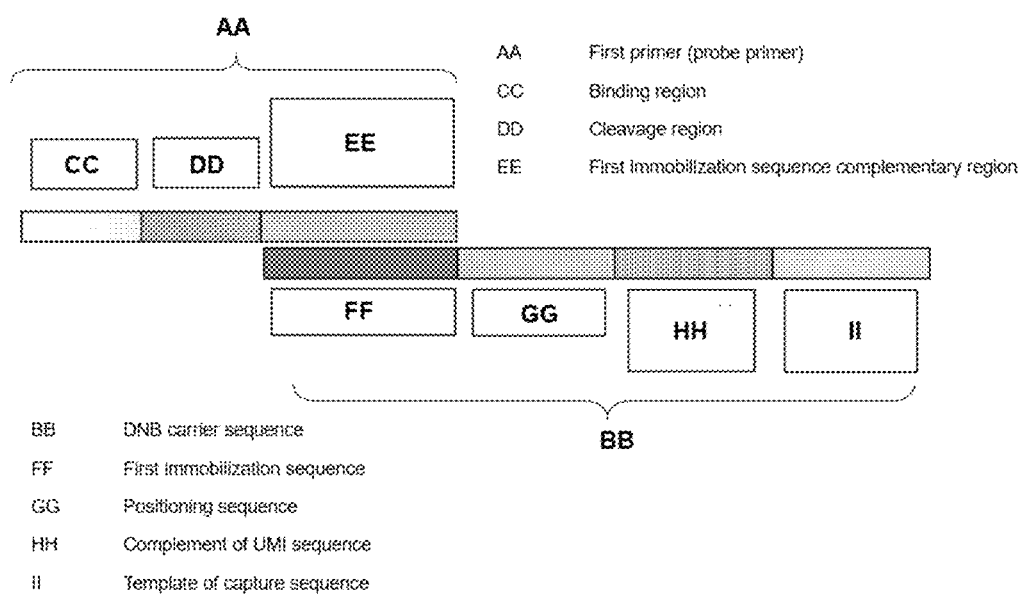
FIG. 6 shows a schematic diagram of the probe primer and the carrier sequence contained in the DNB of an exemplary embodiment in Example 4.

2. The DNB matched to the capture chip by the cDNA sequencing was further analyzed, and the alignment analysis between the second strand sequencing result of cDNA (mRNA expression in reaction tissue) of these DNB reads and mouse genome was performed. For the DNB aligned to mouse genome, the mouse mRNA information was aligned to the capture chip through the 25 bp sequencing result. As shown in FIG. 5, the left side showed the full overall picture of the mRNA expression in the analyzed tissue section, the overall picture showed that this capture chip could analyze the mRNA expression differences in tissues; the right side of this figure showed the tissue expression level of a randomly selected gene expressed in mouse cerebellum, which indicated that this chip could analyze the expression differences of a certain gene in the whole tissue.

Example 4. Preparation of Capture Chip (2)

1. The following DNA library sequence was designed and synthesized. The sequence synthesis was performed by Beijing Liuhe BGI.

5'-phosphorylated-GAACGA-CATGGCTTTTTCCCGTAGC-CATGTCGTTCTGCGCCTTC CCGATG (immobilization sequence 1, SEQ ID NO: 12) NNNNNNNNNNNNNNNNNNNNN (positioning sequence template, N represented any base, for example, C, G, A or T) IIIIIIIII (UMI template, I represented Inosine) TTTTTTTTTTTTTTTTTTTTTT (capture sequence, SEQ ID NO: 13) CCTCAGC (cleavage site, SEQ ID NO: 14) CCTTGGCTCACA (immobilization sequence 2, SEQ ID NO: 15). Wherein, the immobilization sequence 1 comprised a partial sequence of the complement of first immobilization sequence and a circularization site, and the immobilization sequence 2 comprised a partial sequence of the complement of first immobilization sequence and a circularization site.

2. In Situ Amplification of Library

Preparation of DNA nanoball (DNB): 40 ul of the following reaction system was prepared, 80 fmol of the above-mentioned DNA library was added, the DNB primer has a sequence of GACATGGCTACGTGTGAGCCAAGG (SEQ ID NO: 16), which was synthesized by Beijing Liuhe BGI.

| Ingredient | Volume (ul) | Final concentration |
|---|---|---|
| DNA library sequence | 80 fmol (x) | |
| 10× phi29 buffer (produced by BGI) | 4 | 1× |
| DNB primer sequence, 10 uM | 4 | 1 uM |
| H$_2$O | 32-x | |

The above reaction system was placed in a PCR machine for reaction, and the reaction conditions were as follows: 95° C. for 3 min, 40° C. for 3 min; after the reaction, it was placed on ice, added with 40 ul of mixed enzyme I and 2 ul of mixed enzyme II required to prepare DNB in DNBSEQ sequencing kit, and 1 ul of ATP (100 mM mother liquor, Thermo Fisher), 0.1 ul of T4 ligase (produced by BGI). After mixing well, the above reaction system was transferred to a PCR machine at 30° C. and reacted for 20 minutes to form DNB. The DNB was loaded on the BGISEQ500 sequencing chip according to the method described in the BGISEQ500 SE50 kit.

3. Decoding of spatial information (1) Surface modification of chip:

The surface of the above BGISEQ-500 platform chip was allowed to contact with Azido-dPEG®8-NHS ester that had a structure as follows:

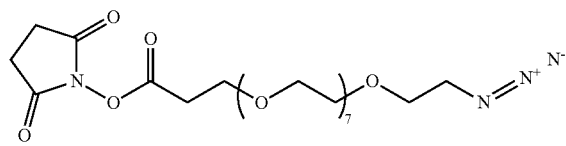

The chip surface modification was carried out according to the following method: NHS-PEG8-Azido (564.58 g/mol) concentration was 45 μM, and 100 ml was prepared by the method:

| Reagent | Dosage | Unit |
|---|---|---|
| NHS-PEG8-Azido | 2.54 | mg |
| 1× PBS (pH 7.4) | 100 | ml |

Stored at −20° C., avoided repeated freezing and thawing.

DBCO-primer had a concentration of 1 uM, and diluted with PBS.

(2) Coupling of primer probe:

The following primer probe sequences were synthesized by Beijing Liuhe BGI:

DBCO (linking group)-UUU (USER cleavage site) TTTTTCCCGTAGCCATGTCGTTCT GCGCCTTCCCGATG (SEQ ID NO: 17, this sequence comprised a complement of first immobilization sequence, a PCR amplification site sequence, an intermediate sequence). 1 uM of the above primer probe was diluted with PBS and introduced to the chip modified with azido, and reacted at room temperature for 1 hour or overnight.

(3) Decoding of spatial information. According to the instructions of the BGISEQ500 SE50 sequencing kit, the spatial information sequence was decoded and sequenced with a sequencing length of 30 bp (the first 20 bp was spatial information sequence, and the last 10 bp was probe tag sequence). The fq file formed by sequencing was stored for later use.

(4) Synthesis of capture region:

A mixed solution of dTTP and Hifi polymerase was prepared, DNB was used as a template, a probe sequence comprising a spatial positioning region was used as a primer, and dTTP was used as a substrate, to extend an oligo dT sequence.

Figure 7:
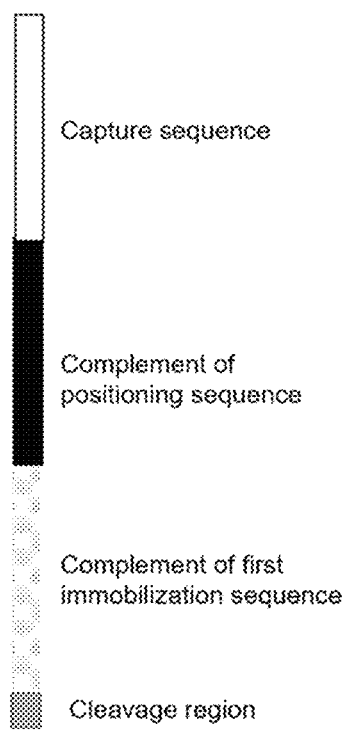
FIG. 7 shows a schematic diagram of the probe ligated to the chip in Example 4.

4. Release of probe comprising spatial information 1 uM of Spatial_RNA_BbvCI primer (diluted with 5×SSC) was prepared, the primer sequence CCTCAGCCAACTCCT (SEQ ID NO: 18) was synthesized by Beijing Liuhe BGI. hybridization was performed at room temperature for 30 minutes. BbvCI excision system (1.5 ml) was prepared: 15 ul RE+150 ul 10×CS Buffer+1335 ul ddH$_2$O, and introduced to the chip after the spatial positioning region was decoded, reaction was performed at 37° C. for 1 h or overnight. Washing was performed twice by adding WB2 of the sequencing kit (MGI), then reaction was performed using formamide at 55° C. for 15 min, followed by washing with WB2 twice. The schematic diagram of the obtained probe was shown in FIG. 7, and the probe sequence was as follows:

UUU (cleavage region) TTTTTCCCGTAGCCATGTCGTTCTGCGCCTTCCCGATG (complement of first immobilization sequence, SEQ ID NO: 19) NNNNNNNNNNNNNNNNNNNN (complement of positioning sequence, which was the same as the positioning sequence template in the DNA library sequence in step 1) NNNNNNNNNN (UMI sequence, which was a complementary sequence of the random base sequence obtained from the UMI template which is used as a template in step 1) TTTTTTTTTTTTTTTTTTTTT (capture sequence, SEQ ID NO: 20).

5. Chip dicing

The prepared capture chip was cut into several small slices, the size of the slices was adjusted according to the needs of the experiment, and the chip was immersed in 50 mM tris buffer, pH8.0, and stored at 4° C. for later use.

Example 5. Capture of Tissue mRNA and Synthesis of cDNA

1. Frozen tissue section. Cerebellar tissue sections of mice were made according to the standard procedure of frozen section.

2. Capture of mRNA. According to the size of the tissue section, the chip with suitable size prepared in Example 4 was taken and placed at room temperature. After the liquid on the chip had evaporated, the tissue section was attached to the capture chip by virtue of the temperature difference between the tissue section and the chip in the tissue chopper. The attached tissue section was placed at room temperature, 5×SSC reaction solution was added to the chip (and fully covered the tissue-attached area), and reaction was performed at 30° C. for 30 minutes to allow the mRNA in the tissue to fully hybridize with the capture region on the chip.

Figure 8:
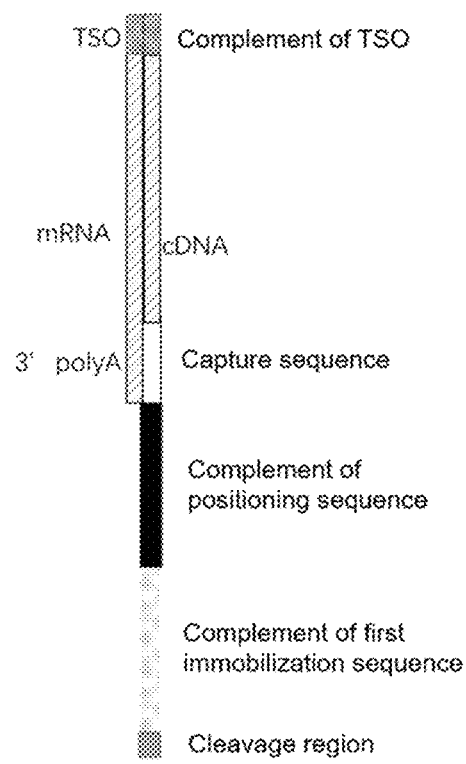
FIG. 8 shows a schematic diagram of cDNA synthesis of the captured nucleic acid molecule in Example 5.

3. Synthesis of cDNA. 5×SSC was used to wash the chip twice at room temperature, 200 ul of the following reverse transcriptase reaction system was prepared, the reaction solution was added to the chip to fully cover it, reaction was performed at 42° C. for 90 min to 180 min. mRNA would use polyT as primer for cDNA synthesis, and the 3' end of mRNA carried TSO tag (CGTAGCCATGTCGTTCTGCG/rG//rG//iXNA_G/) (SEQ ID NO: 21) for the synthesis of cDNA complementary strand. The structure diagram of the above process was shown in FIG. 8.

| Ingredient | Volume (ul) | Final concentration |
|---|---|---|
| Superscript II First strand buffer (5×), Thermo Fisher | 40 | 1× |
| Betaine (5M), Aladdin | 40 | 1M |
| dNTP (10 mM), Thermo Fisher | 20 | 1 mM |
| MgCl₂ (100 mM), Aladdin | 15 | 7.5 mM |
| TSO sequence (50 uM), synthesized by Beijing Liuhe BGI | 10 | 1 uM |
| Superscript II RT (200 U/ul), Thermo Fisher | 10 | 10 U/ul |
| DTT (100 mM) | 10 | 5 mM |
| RNase inhibitor (40 U/ul), Thermo Fisher | 5 | 1 u/ul |
| NF H₂O | 50 | |

Figure 9:
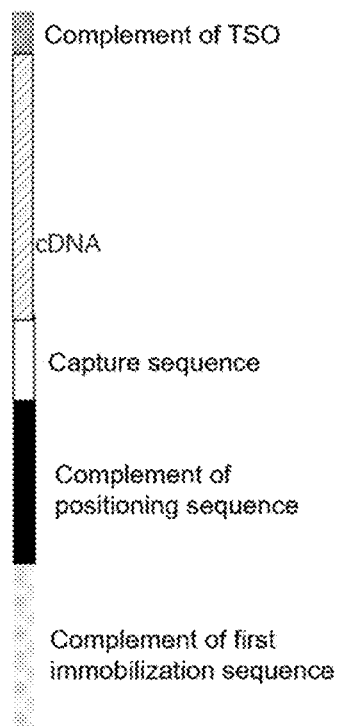
FIG. 9 shows a schematic diagram of the molecule released from the chip in Example 5.

4. Release of cDNA. After the cDNA first strand was synthesized on the chip, a USER enzyme reaction system was prepared, and the reaction was carried out according to the USER enzyme instruction manual. The released molecule had the structure shown in FIG. 9. The reaction solution released from the chip was collected, 2×XP magnetic beads were used to purify the cDNA first strand, and finally 45 ul of TE buffer (Thermo fisher) was used to recover the product.

5. Amplification of cDNA. 100 ul of the following reaction system was prepared:

| Ingredient | Volume (ul) | Concentration |
|---|---|---|
| Recovery product of cDNA first strand | 42 | |
| Primer CGTAGCCATGTCGTTCTGCG (with 5'-phosphorylation, 10 uM, SEQ ID NO: 22) (Beijing Liuhe BGI) | 8 | 0.8 uM |
| 2x HiFi (produced by BGI) | 50 | 1X |

Figure 10:
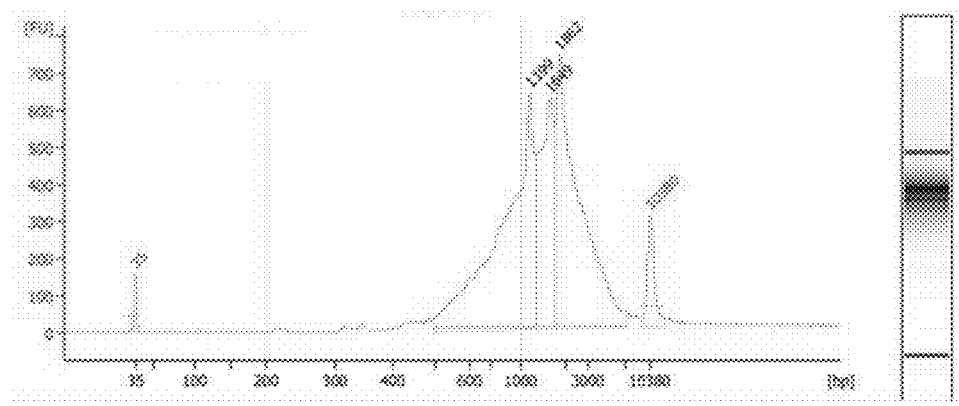
FIG. 10 shows the results of the 2100 detection of cDNA fragment distribution in Example 5.

The above reaction system was transferred to PCR machine, and the following reaction program was set: 95° C. for 3 min, 11 cycles (98° C. for 20 s, 58° C. for 20 s, 72° C. for 3 min), 72° C. for 5 min, 4° C. for co. After the reaction was completed, XP beads were used to purify and recover. The qubit kit was used to quantify the concentration of dsDNA, and the 2100 was used to detect the distribution of cDNA fragments. The 2100 test results were shown in FIG. 10, in which the cDNA length was normal.

Example 6. Construction and Sequencing of cDNA Library

1. Tn5 interruption. According to the cDNA concentration, 20 ng of cDNA was added with 0.5 uM of Tn5 enzyme and corresponding buffer (the coating method for Tn5 enzyme was performed according to the stLFR library construction kit), and mixed well to form 20 ul of reaction system. The reaction was performed at 55° C. for 10 min, and 5 ul of 0.1% SDS was added and mixed at room temperature for 5 minutes to end the Tn5 interruption step.

2. PCR amplification. 100 ul of the following reaction system was prepared:

| Ingredient | Volume (ul) | Concentration |
|---|---|---|
| Product after Tn5 interruption | 25 | |
| 2x Hifi ready mix (produced by BGI) | 50 | 0.8 uM |
| Primer CGTAGCCATGTCGTTCTGCG (with 5'-phosphorylation, 10 uM, SEQ ID NO: 23) (Beijing Liuhe BGI) | 4 | 0.4 uM |
| Primer GAGACGTTCTCGACTCAGAAGATG (SEQ ID NO: 24) (synthesized by Beijing Liuhe BGI) | 4 | 0.4 uM |
| NF H₂O | 17 | |

After mixing, it was placed in a PCR machine, the following program was set: 95° C. for 3 min, 11 cycles (98° C. for 20 s, 58° C. for 20 s, 72° C. for 3 min), 72° C. for 5 min, 4° C. for co. After the reaction was completed, XP beads were used to purify and recover. The dsDNA concentration was quantified using the qubit kit.

3. Sequencing. 80 fmol of the amplification product after the above interruption was taken to prepare DNB. 40 ul of the following reaction system was prepared:

| Ingredient | Volume (ul) | Final concentration |
|---|---|---|
| Amplification product after the above interruption | 80 fmol (X) | |
| 10x phi29 buffer (produced by BGI) | 4 | 1X |
| DNB primer sequence 10 uM (CGAGAACGTCTCCGTAGCCATGTC, SEQ ID NO: 25) (synthesized by Beijing Liuhe BGI) | 4 | 1 uM |
| H₂O | 32-x | |

The above reaction system was placed in a PCR machine for reaction, and the reaction conditions were as follows: 95° C. for 3 min, 40° C. for 3 min After the reaction, it was placed on ice, added with 40 ul of mixed enzyme I and 2 ul of mixed enzyme II required to prepare DNB in DNBSEQ sequencing kit, as well as 1 ul of ATP (100 mM mother liquor, Thermo Fisher) and 0.1 ul of T4 ligase (produced by BGI). After mixing well, the above reaction system was transferred to a PCR machine at 30° C. and reacted for 20 minutes to form DNB. The DNB was loaded to the sequencing chip of MGISEQ2000 according to the method described in the PESO kit of MGISEQ2000, and the sequencing was performed according to the relevant instructions with the customer sequencing mode, wherein the sequencing of first strand was divided into two stages, i.e., sequencing 20 bp and then sequencing 10 bp probe tag sequence, and 50 bp was sequenced for second strand.

Data Analysis

Figure 11:
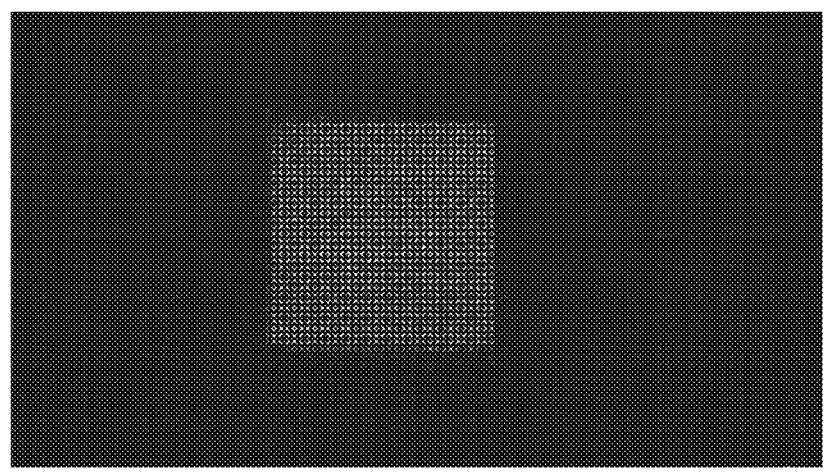
FIG. 11 shows the matching result of the 20 bp sequence of first strand obtained by cDNA sequencing in Example 6 and the fq of the positioning sequence on the capture chip.

1. The 20 bp sequence of first strand obtained by cDNA sequencing was matched with the fq of spatial information sequence on the chip (the sequencing result obtained in step 3 in Example 4) by alignment. The matching result was shown in FIG. 11, in which the bright area represented the region where the 20 bp of cDNA sequencing exactly matched the capture chip, and this region represented the region on the capture chip for tissue capture. It showed that the capture chip could use the spatial positioning region to accurately locate the tissue capture region.

Figure 12:
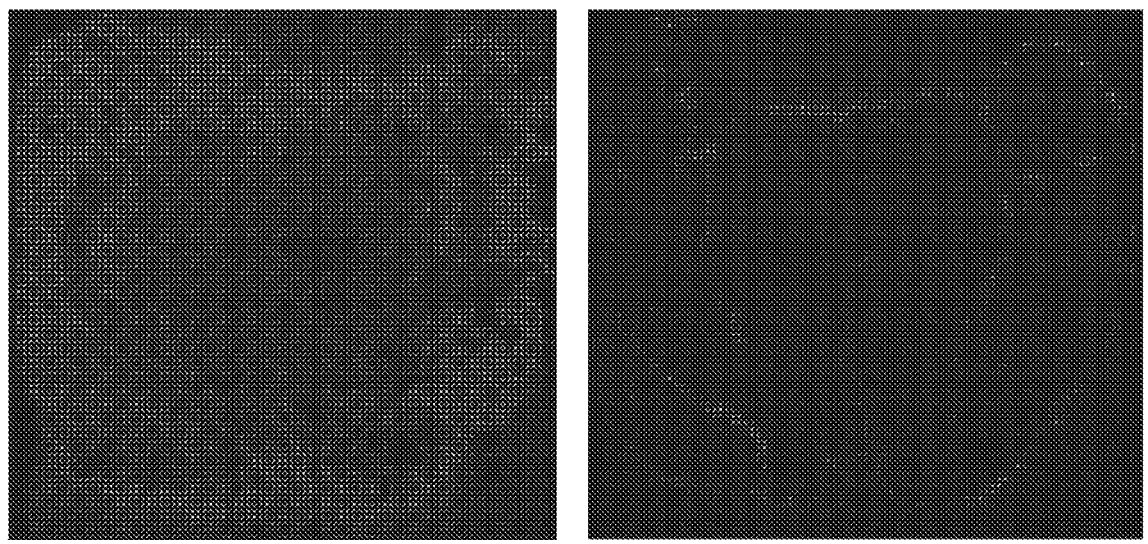
FIG. 12 shows a graph of the expression of mRNA in the tissue section in Example 6.

2. The DNB matched the capture chip by cDNA sequencing was further analyzed, and the alignment analysis between the second strand sequencing results of cDNA (mRNA expression in reaction tissue) of these DNB reads and mouse genome was performed. For the DNB aligned to the mouse genome, the mouse mRNA information was aligned to the capture chip through the 20 bp sequencing result. As shown in FIG. 12, the left side showed the overall picture of the mRNA expression in the analyzed tissue section, and the overall picture showed that this capture chip could analyze mRNA expression differences in tissues; the right side of this figure showed the tissue expression level of a randomly selected gene expressed in mouse cerebellum, which indicated that this chip could analyze the expression differences of a certain gene in the whole tissue.

Although the specific embodiments of the present invention have been described in detail, those skilled in the art will understand that various modifications and changes can be made to the details according to all the teachings that have been published, and these changes are within the protection scope of the present invention. All of the present invention is given by the appended claims and any equivalents thereof.

What is claimed is:

1. A method for generating a nucleic acid array for detecting spatial information of a nucleic acid in a biological sample, which comprises the following steps:
   (1) providing multiple kinds of carrier sequences, each kind of carrier sequence comprises a plurality of copies of the carrier sequence, and the carrier sequence in the direction from 5' to 3' comprises a positioning sequence and a first immobilization sequence,
   the positioning sequence has a unique nucleotide sequence corresponding to the position of the kind of carrier sequence on the array;
   the first immobilization sequence allows annealing to its complementary nucleotide sequence and initiating an extension reaction;
   (2) ligating the multiple kinds of carrier sequences to a surface of a solid support;
   (3) providing a first primer, and perform a primer extension reaction by using the carrier sequence as a template, so that a region of the first immobilization sequence and the positioning sequence of the carrier sequence forms a double strand, wherein the strand that hybridizes to the carrier sequence is a first nucleic acid molecule, the first nucleic acid molecule in the direction from 5' to 3' comprises a complementary sequence of the first immobilization sequence and a complementary sequence of the positioning sequence; wherein, the first primer comprises a first immobilization sequence complementary region at its 3' end, the first immobilization sequence complementary region comprises a complementary sequence of the first immobilization sequence or a fragment thereof, and has a free 3' end;
   and wherein in step (1), the multiple kinds of carrier sequences are provided by the following steps:
   (i) providing multiple kinds of carrier sequence templates, the carrier sequence template comprising a complementary sequence of the carrier sequence;
   (ii) perform a nucleic acid amplification reaction by using each kind of carrier sequence template as a template, to obtain an amplification product of each kind of carrier sequence template, the amplification product comprising a plurality of copies of the carrier sequence;
   and wherein said each kind of carrier sequence comprising the same positioning sequence occupies an area having a diameter of less than 1 micrometer.

2. The method according to claim 1, wherein
   rolling circle amplification is performed to obtain a DNB formed by a concatemer of the carrier sequence; or,
   bridge PCR amplification, emulsion PCR amplification or multiple strand displacement amplification is performed to obtain a DNA cluster formed by a clone population of the carrier sequence.

3. The method according to claim 1, wherein the method further comprises the following steps:
   (4) providing a second nucleic acid molecule, the second nucleic acid molecule comprising a capture sequence;
   the capture sequence is capable of hybridizing with the whole or part of the nucleic acid to be captured, which comprises: (a) an oligonucleotide sequence capable of capturing mRNA; (b) a random or degenerate oligonucleotide sequence; or, (c) a specific sequence for a specific target nucleic acid; and, the capture sequence has a free 3' end to enable the second nucleic acid molecule to function as an extension primer,
   (5) ligating the second nucleic acid molecule to the first nucleic acid molecule.

4. The method according to claim 3, wherein the second nucleic acid molecule in the direction from 5' to 3' comprises an immobilization region and a capture sequence, and the immobilization region comprises a double-stranded DNA sequence.

5. The method according to claim 3, wherein each carrier sequence further comprises a second immobilization sequence at its 5' end, and the second immobilization sequence allows annealing to its complementary nucleotide sequence; the method further comprises the following steps:
   (4) providing a second nucleic acid molecule, the second nucleic acid molecule in the direction from 5' to 3' comprising a complement of second immobilization sequence and a capture sequence;
   the complement of second immobilization sequence allows hybridization to its complementary nucleotide sequence;
   the capture sequence is capable of hybridizing with the whole or part of the nucleic acid to be captured, and comprises: (a) an oligonucleotide sequence capable of capturing mRNA; (b) a random or degenerate oligonucleotide sequence; or, (c) a specific sequence for a specific target nucleic acid; and, the capture sequence has a free 3' end to enable the second nucleic acid molecule to function as an extension primer;
   (5) hybridizing the complement of second immobilization sequence with the second immobilization sequence under a condition that allow annealing, thereby ligating the second nucleic acid molecule to the carrier sequence;
   (6) optionally, ligating the first nucleic acid molecule and the second nucleic acid molecule that are hybridized to the carrier sequence respectively.

6. The method according to claim 3, wherein, in step (3), the first primer further comprises a unique molecular identifier (UMI) at the 5' end of its first immobilization sequence complementary region, so that the first nucleic acid molecule comprises the UMI sequence at the 5' end of its complement of first immobilization sequence; or, in step (4), the second nucleic acid molecule further comprises a UMI sequence, and the UMI sequence is located at the 5' end of the capture sequence;
   and wherein the UMI sequence is a nucleotide sequence consisting of at least 1, at least 2, at least 3, at least 4, or at least 5 nucleotides N, each N is independently any one of A, C, G and T.

7. The method according to claim 1, wherein:
   in step (1), the carrier sequence further comprises a capture sequence template located upstream of the positioning sequence, the capture sequence template comprises a complementary sequence of the capture sequence, and the capture sequence can hybridize to the whole or part of the nucleic acid to be captured, which comprises: (a) an oligonucleotide sequence capable of capturing mRNA; (b) a random or degenerate oligonucleotide sequence; or, (c) a specific sequence for a specific target nucleic acid; and the first immobilization sequence of the carrier sequence also comprises a cleavage site, and the cleavage is selected from enzymatic cleavage with nicking enzyme, enzymatic cleavage with USER enzyme, photocleavage, chemical cleavage or CRISPR-based cleavage;
   in step (3), a region of the first immobilization sequence, the positioning sequence and the capture sequence template of the carrier sequence forms a double strand, so that the first nucleic acid molecule in the direction from 5' to 3' comprises a complement of first immobilization sequence, a complement of positioning sequence and a capture sequence; wherein, the first primer in the direction from 5' to 3' comprises a binding region, an cleavage region, and a first immobilization sequence complementary region, the binding region comprises a linker capable of ligating to the surface of the solid support, and the cleavage region comprises a cleavage site;

and, the method further comprises the following steps:
(4) ligating the first primer to the surface of the solid support; wherein, steps (3) and (4) are performed in any order;
(5) optionally, performing cleavage at the cleavage site contained in the first immobilization sequence of the carrier sequence to digest the carrier sequence, so that the extension product in step (3) is separated from the template where such extension product is formed, and the first nucleic acid molecule is therefore ligated to the surface of the solid support.

8. The method according to claim 7, wherein, in step (1), the cleavage site contained in the first immobilization sequence is a cleavage site of nicking enzyme.

9. The method according to claim 7, wherein, in step (1), the carrier sequence further comprises a complement of UMI sequence located downstream of the capture sequence template and upstream of the first immobilization sequence, the complement of UMI sequence is complementary to a UMI sequence, and the UMI sequence is a nucleotide sequence consisting of at least 1, at least 2, at least 3, at least 4, or at least 5 nucleotides N, each N is independently any one of A, C, G and T;

and, in step (3), a region of the first immobilization sequence, the positioning sequence, the capture sequence template, and the complement of UMI sequence of the carrier sequence forms a double strand, so that the first nucleic acid molecule in the direction from 5' to 3' comprises the complement of first immobilization sequence, the complement of positioning sequence and the capture sequence, and the UMI sequence located upstream of the capture sequence and downstream of the complement of first immobilization sequence.

10. The method according to claim 7, wherein the linker of the first primer is a linking group capable of coupling with an activating group, and the surface of the solid support is modified by the activating group

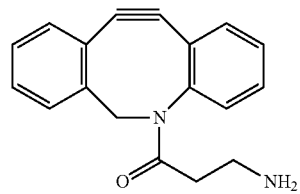 [SMILES: NCCC(=O)N1Cc2ccccc2C#Cc2ccccc21]

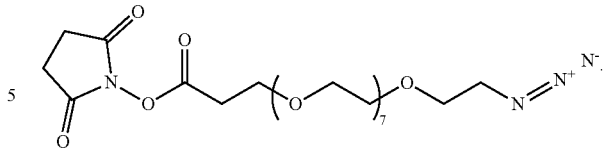

11. The method according to claim 7, wherein the cleavage site contained in the cleavage region of the first primer is a site where controlled cleavage is performed by a chemical, enzymatic, or photochemical method;

and wherein the cleavage region of the first primer is different from the cleavage site contained in the first immobilization sequence of the carrier sequence.

12. The method according to claim 1, wherein the solid support is a sequencing chip.

13. The method according to claim 1, wherein, in step (3), while performing an extension reaction, the carrier sequence is sequenced to obtain the sequence information of the positioning sequence contained in the carrier sequence.

14. The method according to claim 1, wherein, before step (3), a step of sequencing the carrier sequence is comprised.

15. The method according to claim 3, wherein in step (5), using a ligase to ligate the second nucleic acid molecule to the first nucleic acid molecule.

16. The method according to claim 5, wherein using a ligase to ligate the second nucleic acid molecule to the first nucleic acid molecule.

17. The method according to claim 7, wherein each kind of carrier sequence is a DNB formed by a concatemer of the multiple copies of carrier sequence.

18. The method according to claim 10, wherein the linker comprises —SH,-DBCO or —NHS.

19. The method according to claim 10, wherein the linker is (DBCO)

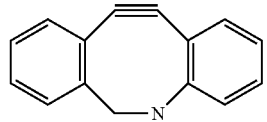

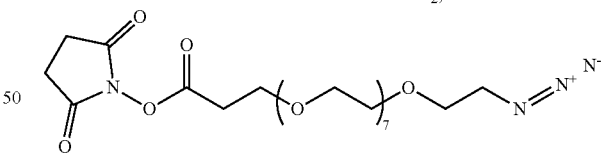

(Azido-dPEG®8-NHS ester)

is attached to the surface of the solid support.

* * * * *

SEQUENCE LISTING

<160> NUMBER OF SEQ ID NOS: 25

<210> SEQ ID NO 1
<211> LENGTH: 32
<212> TYPE: DNA
<213> ORGANISM: Artificial sequence
<220> FEATURE:
<223> OTHER INFORMATION: Linker A

<400> SEQUENCE: 1
aagtcggagg ccaagcggtc ttaggaagac aa                       32

<210> SEQ ID NO 2
<211> LENGTH: 15
<212> TYPE: DNA
<213> ORGANISM: Artificial sequence

```
<220> FEATURE:
<223> OTHER INFORMATION: complement of second immobilization sequence

<400> SEQUENCE: 2
ctgataaggt cgcca                                                        15

<210> SEQ ID NO 3
<211> LENGTH: 42
<212> TYPE: DNA
<213> ORGANISM: Artificial sequence
<220> FEATURE:
<223> OTHER INFORMATION: Linker B

<400> SEQUENCE: 3
caactccttg gctcacagaa cgacatggct acgatccgac tt                          42

<210> SEQ ID NO 4
<211> LENGTH: 24
<212> TYPE: DNA
<213> ORGANISM: Artificial sequence
<220> FEATURE:
<223> OTHER INFORMATION: Primer

<400> SEQUENCE: 4
ggcctccgac ttaagtcgga tcgt                                              24

<210> SEQ ID NO 5
<211> LENGTH: 15
<212> TYPE: DNA
<213> ORGANISM: Artificial sequence
<220> FEATURE:
<223> OTHER INFORMATION: complement of second immobilization sequence

<400> SEQUENCE: 5
ctgataaggt cgcca                                                        15

<210> SEQ ID NO 6
<211> LENGTH: 21
<212> TYPE: DNA
<213> ORGANISM: Artificial sequence
<220> FEATURE:
<223> OTHER INFORMATION: capture sequence
<220> FEATURE:
<221> NAME/KEY: misc_feature
<222> LOCATION: (21)..(21)
<223> OTHER INFORMATION: n = a or g or c or t

<400> SEQUENCE: 6
tttttttttt tttttttttv n                                                 21

<210> SEQ ID NO 7
<211> LENGTH: 23
<212> TYPE: DNA
<213> ORGANISM: Artificial sequence
<220> FEATURE:
<223> OTHER INFORMATION: TSO tag
<220> FEATURE:
<221> NAME/KEY: misc_feature
<222> LOCATION: (21)..(21)
<223> OTHER INFORMATION: n = riboguanosine (rG)
<220> FEATURE:
<221> NAME/KEY: misc_feature
<222> LOCATION: (22)..(22)
<223> OTHER INFORMATION: n = riboguanosine (rG)
<220> FEATURE:
<221> NAME/KEY: misc_feature
<222> LOCATION: (23)..(23)
<223> OTHER INFORMATION: n = Locked nucleic acid (LNA)-modified G
      (iXNA_G)
```

<400> SEQUENCE: 7
aagtcggagg ccaagcggtc nnn                                           23

<210> SEQ ID NO 8
<211> LENGTH: 20
<212> TYPE: DNA
<213> ORGANISM: Artificial sequence
<220> FEATURE:
<223> OTHER INFORMATION: Primer

<400> SEQUENCE: 8
aagtcggagg ccaagcggtc                                               20

<210> SEQ ID NO 9
<211> LENGTH: 20
<212> TYPE: DNA
<213> ORGANISM: Artificial sequence
<220> FEATURE:
<223> OTHER INFORMATION: Primer

<400> SEQUENCE: 9
aagtcggagg ccaagcggtc                                               20

<210> SEQ ID NO 10
<211> LENGTH: 24
<212> TYPE: DNA
<213> ORGANISM: Artificial sequence
<220> FEATURE:
<223> OTHER INFORMATION: Primer

<400> SEQUENCE: 10
gagacgttct cgactcagaa gatg                                          24

<210> SEQ ID NO 11
<211> LENGTH: 24
<212> TYPE: DNA
<213> ORGANISM: Artificial sequence
<220> FEATURE:
<223> OTHER INFORMATION: Primer

<400> SEQUENCE: 11
ggcctccgac ttgagacgtt ctcg                                          24

<210> SEQ ID NO 12
<211> LENGTH: 50
<212> TYPE: DNA
<213> ORGANISM: Artificial sequence
<220> FEATURE:
<223> OTHER INFORMATION: immobilization sequence 1

<400> SEQUENCE: 12
gaacgacatg gcttttccc gtagccatgt cgttctgcgc cttcccgatg               50

<210> SEQ ID NO 13
<211> LENGTH: 21
<212> TYPE: DNA
<213> ORGANISM: Artificial sequence
<220> FEATURE:
<223> OTHER INFORMATION: capture sequence

<400> SEQUENCE: 13
tttttttttt tttttttttt t                                             21

<210> SEQ ID NO 14

```
<211> LENGTH: 7
<212> TYPE: DNA
<213> ORGANISM: Artificial sequence
<220> FEATURE:
<223> OTHER INFORMATION: cleavage site

<400> SEQUENCE: 14 cctcagc                                                                    7

<210> SEQ ID NO 15
<211> LENGTH: 12
<212> TYPE: DNA
<213> ORGANISM: Artificial sequence
<220> FEATURE:
<223> OTHER INFORMATION: immobilization sequence 2

<400> SEQUENCE: 15
ccttggctca ca                                                             12

<210> SEQ ID NO 16
<211> LENGTH: 24
<212> TYPE: DNA
<213> ORGANISM: Artificial sequence
<220> FEATURE:
<223> OTHER INFORMATION: Primer

<400> SEQUENCE: 16
gacatggcta cgtgtgagcc aagg                                                24

<210> SEQ ID NO 17
<211> LENGTH: 38
<212> TYPE: DNA
<213> ORGANISM: Artificial sequence
<220> FEATURE:
<223> OTHER INFORMATION: a sequence comprising a complement of first
      immobilization sequence, a PCR amplification site sequence and an
      intermediate sequence

<400> SEQUENCE: 17
tttttcccgt agccatgtcg ttctgcgcct tcccgatg                                 38

<210> SEQ ID NO 18
<211> LENGTH: 15
<212> TYPE: DNA
<213> ORGANISM: Artificial sequence
<220> FEATURE:
<223> OTHER INFORMATION: Primer

<400> SEQUENCE: 18
cctcagccaa ctcct                                                          15

<210> SEQ ID NO 19
<211> LENGTH: 38
<212> TYPE: DNA
<213> ORGANISM: Artificial sequence
<220> FEATURE:
<223> OTHER INFORMATION: complement of first immobilization sequence

<400> SEQUENCE: 19
tttttcccgt agccatgtcg ttctgcgcct tcccgatg                                 38

<210> SEQ ID NO 20
<211> LENGTH: 21
<212> TYPE: DNA
<213> ORGANISM: Artificial sequence
<220> FEATURE:
<223> OTHER INFORMATION: capture sequence
```

```
<400> SEQUENCE: 20
tttttttttt tttttttttt t                                            21

<210> SEQ ID NO 21
<211> LENGTH: 23
<212> TYPE: DNA
<213> ORGANISM: Artificial sequence
<220> FEATURE:
<223> OTHER INFORMATION: TSO tag
<220> FEATURE:
<221> NAME/KEY: misc_feature
<222> LOCATION: (21)..(21)
<223> OTHER INFORMATION: n = riboguanosine (rG)
<220> FEATURE:
<221> NAME/KEY: misc_feature
<222> LOCATION: (22)..(22)
<223> OTHER INFORMATION: n = riboguanosine (rG)
<220> FEATURE:
<221> NAME/KEY: misc_feature
<222> LOCATION: (23)..(23)
<223> OTHER INFORMATION: n = Locked nucleic acid (LNA)-modified G
      (iXNA_G)

<400> SEQUENCE: 21
cgtagccatg tcgttctgcg nnn                                          23

<210> SEQ ID NO 22
<211> LENGTH: 20
<212> TYPE: DNA
<213> ORGANISM: Artificial sequence
<220> FEATURE:
<223> OTHER INFORMATION: Primer

<400> SEQUENCE: 22
cgtagccatg tcgttctgcg                                              20

<210> SEQ ID NO 23
<211> LENGTH: 20
<212> TYPE: DNA
<213> ORGANISM: Artificial sequence
<220> FEATURE:
<223> OTHER INFORMATION: Primer

<400> SEQUENCE: 23
cgtagccatg tcgttctgcg                                              20

<210> SEQ ID NO 24
<211> LENGTH: 24
<212> TYPE: DNA
<213> ORGANISM: Artificial sequence
<220> FEATURE:
<223> OTHER INFORMATION: Primer

<400> SEQUENCE: 24
gagacgttct cgactcagaa gatg                                         24

<210> SEQ ID NO 25
<211> LENGTH: 24
<212> TYPE: DNA
<213> ORGANISM: Artificial sequence
<220> FEATURE:
<223> OTHER INFORMATION: Primer

<400> SEQUENCE: 25
cgagaacgtc tccgtagcca tgtc                                         24
```